(12) United States Patent
Cao et al.

(10) Patent No.: US 10,727,990 B2
(45) Date of Patent: *Jul. 28, 2020

(54) PACKET DURATION INDICATION IN A HIGH EFFICIENCY WIRELESS LOCAL AREA NETWORK (WLAN)

(71) Applicant: NXP USA, Inc., Austin, TX (US)

(72) Inventors: Rui Cao, Fremont, CA (US); Xiayu Zheng, San Jose, CA (US); Hongyuan Zhang, Fremont, CA (US)

(73) Assignee: NXP USA, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/055,743

(22) Filed: Aug. 6, 2018

(65) Prior Publication Data
US 2018/0351710 A1 Dec. 6, 2018

Related U.S. Application Data

(63) Continuation of application No. 14/688,884, filed on Apr. 16, 2015, now Pat. No. 10,044,476.
(Continued)

(51) Int. Cl.
*H04J 11/00* (2006.01)
*H04L 5/00* (2006.01)
(Continued)

(52) U.S. Cl.
CPC .......... *H04L 5/0007* (2013.01); *H04B 7/12* (2013.01); *H04L 27/261* (2013.01); *H04L 27/2607* (2013.01)

(58) Field of Classification Search
None
See application file for complete search history.

(56) References Cited

U.S. PATENT DOCUMENTS 7,599,332 B2  10/2009  Zelst et al.
7,742,390 B2  6/2010  Mujtaba
(Continued)

FOREIGN PATENT DOCUMENTS

CN  101997814 A  3/2011
CN  102057641 A  5/2011
(Continued)

OTHER PUBLICATIONS

Notice of Allowance in U.S. Appl. No. 14/688,859, dated Jul. 13, 2018 (10 pages).
(Continued)

*Primary Examiner* — Willie J Daniel, Jr.

(57) ABSTRACT

A first set of orthogonal frequency domain multiplexing (OFDM) symbols for a first portion of a PHY data unit and a second set of OFDM symbols for a second portion of the PHY data unit are generated. OFDM symbols of the first set are generated with a first OFDM tone spacing. At least some OFDM symbols of the second set are generated with a second tone spacing different from the first tone spacing. A value for a length indicator indicative of a duration of the PHY data unit is determined based on the first tone spacing and the second tone spacing. The first portion of the PHY data unit is generated to include (i) the first set of OFDM symbols and (ii) the length indicator set to the determined value. The second portion of the PHY data unit is generated to include the second set of OFDM symbols.

19 Claims, 10 Drawing Sheets

US 10,727,990 B2
Page 2

Related U.S. Application Data

(60) Provisional application No. 62/138,148, filed on Mar. 25, 2015, provisional application No. 62/114,232, filed on Feb. 10, 2015, provisional application No. 62/012,930, filed on Jun. 16, 2014, provisional application No. 61/980,417, filed on Apr. 16, 2014.

(51) Int. Cl.
*H04L 27/26* (2006.01)
*H04B 7/12* (2006.01)

(56) References Cited

U.S. PATENT DOCUMENTS

| | | | |
|---|---|---|---|
| 8,155,138 | B2 | 4/2012 | van Nee |
| 8,289,869 | B2 | 10/2012 | Sawai |
| 8,339,978 | B2 | 12/2012 | Sawai et al. |
| 8,494,065 | B2 | 7/2013 | Brehler et al. |
| 8,526,351 | B2 | 9/2013 | Fischer et al. |
| 8,599,804 | B2 | 12/2013 | Erceg et al. |
| 8,619,907 | B2 | 12/2013 | Mujtaba et al. |
| 8,724,720 | B2 | 5/2014 | Srinivasa et al. |
| 8,885,740 | B2 * | 11/2014 | Zhang ............... H03M 13/23 375/260 |
| 9,130,727 | B2 | 9/2015 | Zhang et al. |
| 9,154,274 | B2 | 10/2015 | Walton et al. |
| 9,294,323 | B2 | 3/2016 | Zhang |
| 9,655,002 | B2 | 5/2017 | Zhang et al. |
| 10,044,476 | B2 | 8/2018 | Cao et al. |
| 2009/0196163 | A1 | 8/2009 | Du |
| 2010/0046656 | A1 | 2/2010 | van Nee et al. |
| 2010/0260159 | A1 | 10/2010 | Zhang et al. |
| 2011/0002219 | A1 | 1/2011 | Kim et al. |
| 2012/0039292 | A1 | 2/2012 | Lee et al. |
| 2012/0054587 | A1 | 3/2012 | Van Nee et al. |
| 2012/0294392 | A1 | 11/2012 | Zhang |
| 2012/0324315 | A1 | 12/2012 | Zhang et al. |
| 2013/0128807 | A1 | 5/2013 | Vermani et al. |
| 2013/0259017 | A1 | 10/2013 | Zhang et al. |
| 2014/0211775 | A1 | 7/2014 | Sampath et al. |
| 2014/0362935 | A1 | 12/2014 | Porat et al. |
| 2015/0009894 | A1 | 1/2015 | Vermani et al. |
| 2015/0304077 | A1 | 10/2015 | Cao et al. |
| 2016/0050093 | A1 | 2/2016 | Choi et al. |
| 2016/0072654 | A1 | 3/2016 | Choi et al. |

FOREIGN PATENT DOCUMENTS

| | | |
|---|---|---|
| CN | 102396186 A | 3/2012 |
| CN | 103444114 A | 12/2013 |
| WO | WO-2012/122119 | 9/2012 |

OTHER PUBLICATIONS

Communication Pursuant to Article 94(3) EPC in European Patent Application No. 15720160.9, dated May 7, 2019 (4 pages).
Office Action in Chinese Patent Application No. 201580029948.2, dated Jan. 16, 2019, with English summary (8 pages).
Chinese Search Report sent with Office Action dated Jan. 16, 2019 (2 pages).
Chun et al., "Legacy Support on HEW Frame Structure," IEEE Draft 11-13/1057r0, 8 pages (Sep. 16, 2013).
Chen, "Home Network Basis: Transmission Environments and Wired/Wireless Protocols," Prentice Hall, pp. 1-26 (Jul. 2003).
Chun et al., "Legacy Support on HEW Frame Structure," IEEE 11-13/1057r0, slides 1-8 (Sep. 16, 2013).
Communication Pursuant to Article 94(3) EPC in European Patent Application No. 15720160,9-1231, dated May 22, 2018 (7 pages).
De Vegt, "Potential Compromise for 802.11ah Use Case Document", Institute of Electrical and Electronics Engineers, doc. No. IEEE 802.11-11/0457r0, pp. 1-27 (Mar. 2011).
Final Office Action in U.S. Appl. No. 14/483,106, dated Aug. 26, 2015 (13 pages).

Hiertz et al., "The IEEE 802.11 Universe," *IEEE Communications Magazine*, pp. 62-70, (Jan. 2010).
IEEE P802.11 n™/D3.00, "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," The Institute of Electrical and Electronics Engineers, Inc., pp. 1-544 (Sep. 2007).
IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, The Institute of Electrical and Electronics Engineers, Inc., pp. 1-1184 (Jun. 12, 2007).
IEEE Std 802.11a-1999 (R2003) (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHz Band," *The Institute of Electrical and Electronics Engineers, Inc.*, pp. 1-92, (1999) Reaffirmed (Jun. 12, 2003).
IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHz Band," *The Institute of Electrical and Electronics Engineers, Inc.*, pp. 1-83 (Sep. 1999).
IEEE Std 802.11ac/D2.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-359 (Jan. 2012).
IEEE Std 802.11ac/D2.1 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-363 (Mar. 2012).
IEEE Std 802.11ac/D3.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-385 (Jun. 2012).
IEEE Std 802.11ac/D4.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-408 (Oct. 2012).
IEEE Std 802.11ac/D5.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-440 (Jan. 2013).

(56) References Cited

OTHER PUBLICATIONS

IEEE Std 802.11ac/D6.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-446 (Jul. 2013).

IEEE Std 802.11ac/D7.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).

IEEE Std 802.11af/D1.05 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: TV White Spaces Operation," *The Institute of Electrical and Electronics Engineers, Inc.*, pp. 1-123 (Nov. 2011).

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, The Institute of Electrical and Electronics Engineers, Inc., pp. Jan. 2695 (Mar. 29, 2012).

IEEE Std P802.11-REVma/06.0, (Revision of IEEE Std 802.11-1999) "Unapproved Draft Standard for Information Technology—Telecommunications and information exchange between systems—Local and metropolitan area network—Specific requirements Part 11:Wireless LAN Medium Access Control (MAC) and Physical Layer (PHY) specifications," (This document reflects the combining of the 2003 Edition of 802.11 plus the 802.11 g, 802.11 h, 802.11 i and 802.11j Amendments) (Superseded by P802.11-REVma.sub.--D7.0),pp. 1-1212 (2006).

IEEE Std. 802.11n™ "IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, pp. 1-535 (Oct. 2009).

Imashioya et al., "RTL Design of 1.2 Gbps MIMO WLAN System and Its Business Aspect," IEEE 9th Int'l Symposium on Communications and Information Technology (ISCIT 2009), *The Institute of Electrical and Electronics Engineers*, pp. 296-301 (2009).

International Preliminary Report on Patentability in International Application No. PCT/US2015/026160, dated Oct. 27, 2016 (9 pages).

International Search Report and Written Opinion in International Application No. PCT/US2015/026160, dated Aug. 4, 2015 (11 pages).

International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, pp. 1-512 (1999).

Kim et al., "VHT Packet Duration Signaling," IEEE Draft doc IEEE 802.11-10/0772r0, dated Jul. 12, 2010 (12 pages).

Lee et al., "TGaf PHY proposal," *The Institute of Electrical and Electronics Engineers*, doc. No. IEEE 802.11-12/0809r5, pp. 1-43, Jul. 10, 2012.

Mujtaba, "IEEE P802.11—Wireless LANs, TGn Sync Proposal Technical Specification," *The Institute of Electrical and Electronics Engineers, Inc.*, doc.: IEEE 802.11-04/0889r6, pp. 1-131 (May 2005).

Non-Final Office Action in U.S. Appl. No. 14/688,859, dated Jun. 22, 2017 (14 pages).

Non-Final Office Action in U.S. Appl. No. 14/688,859, dated Oct. 17, 2016 (21 pages).

Non-Final Office Action in U.S. Appl. No. 14/688,859, dated Oct. 18, 2017 (13 pages).

Notice of Allowance in U.S. Appl. No. 14/483,106, dated Nov. 12, 2015 (8 pages).

Office Action in U.S. Appl. No. 14/688,859, dated Mar. 12, 2018 (16 pages).

Office Action of U.S. Appl. No. 14/483,106, dated Mar. 24, 2015.

Park, "Proposed Specification Framework for TGah D9.x", The Institute of Electrical and Electronics Engineers, doc. No. IEEE 802.11-yy/xxxxr0, pp. 1-30 (Jul. 2012).

Park, "Proposed Specification Framework for TGah", *The Institute of Electrical and Electronics Engineers*, doc. No. IEEE 802.11-11/1137r11, pp. 1-36 (Sep. 2012).

Park, "Proposed Specification Framework for TGah", *The Institute of Electrical and Electronics Engineers*, doc. No. IEEE 802.11-11/1137r6, pp. 1-13 (Mar. 2012).

Park, "Specification Framework for TGah," *The Institute of Electrical and Electronics Engineers*, doc. No. IEEE 802.11-11/1137r13, pp. 1-58 (Jan. 14, 2013).

Perahia et al., "Gigabit Wireless LANs: an overview of IEEE 802.11ac and 80211ad," ACM SIGMOBILE Mobile Computing and Communications Review, vol. 15, No. 3, pp. 23-33 (Jul. 2011).

Shao, "Channel Selection for 802.11ah," doc.: IEEE 802.11-12/0816r0, pp. 1-11 (Jul. 2012).

Shi et al., "Phase Tracking During VHT-LTF," Doc. No. IEEE 802.11-10/0771r0, *The Institute of Electrical and Electronics Engineers, Inc.*, pp. 1-19 (Jul. 2010).

Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).

Stacey et al., "Specification Framework for TGac," document No. IEEE 802.11-09/0992r20, *Institute for Electrical and Electronics Engineers*, pp. 1-49, (Jan. 18, 2011).

Syafei et al., "A Design of Next Generation Gigabit MIMO Wireless LAN System," IEEE 12th Int'l Conference on Advanced Communication Technology (ICACT 2010), *The Institute of Electrical and Electronics Engineers*, pp. 941-946 (2010).

Syafei et al., "A Gigabit MIMO WLAN System with International Standardization Strategy," IEEE Int'l Symposium on Intelligent Signal Processing and Communication Systems (ISPACS 2009), *The Institute of Electrical and Electronics Engineers*, pp. 228-231 (2009).

Syafei et al., "Design of 1.2 Gbps MIMO WLAN System for 4K Digital Cinema Transmission," IEEE 20th Int'l Symposium on Personal, Indoor and Mobile Radio Communications (PIMRC 2009), The Institute of Electrical and Electronics Engineers, pp. 207-211 (2009).

Taghavi et al., "Introductory Submission for TGah", doc. No. IEEE 802.11-11/0062r0, *Institute for Electrical and Electronics Engineers*, pp. 1-5 (Jan. 14, 2011).

Van Nee et al. "The 802.11 n MIMO-OFDM Standard for Wireless LAN and Beyond," Wireless Personal Communications, vol. 37, pp. 445-453 (Jun. 2006).

Van Zelst et al., "Pilot Sequence for VHT-DATA," Doc. No. IEEE 802.11-10/0811r1, *The Institute of Electrical and Electronics Engineers, Inc.*, pp. 1-10 (Jul. 2010).

Vermani et al. "Preamble Format for 1 MHz," *The Institute of Electrical and Electronics Engineers*, doc. No. IEEE 802.11-11/1482r2, pp. 1-30 (Nov. 2011).

Vermani, et al. "Spec Framework Text for PHY Numerology," *The Institute of Electrical and Electronics Engineers*, doc. No. IEEE 802.11-11/1311r0, pp. 1-5 (Sep. 2011).

Yu et al., "Coverage extension for IEEE802.11ah," *The Institute of Electrical and Electronics Engineers*, doc. No. IEEE 802.11-11/0035r1, pp. 1-10 (Jan. 2011).

(56) References Cited

OTHER PUBLICATIONS

Zhang et al., "11ah Data Transmission Flow," *The Institute of Electrical and Electronics Engineers*, doc. No. IEEE 802.11-11/1484r1, pp. 1-15 (Nov. 2011).

Zhang et al., "1MHz Waveform in Wider BW", *The Institute of Electrical and Electronics Engineers*, doc. No. IEEE 802.11-12/0309r1, pp. 1-10 (Mar. 2012).

Zhang et al., "Beamforming Feedback for Single Stream," *The Institute of Electrical and Electronics Engineers*, doc. No. IEEE 802.11-12/1312r0, pp. 1-22 (Nov. 12, 2012).

\* cited by examiner

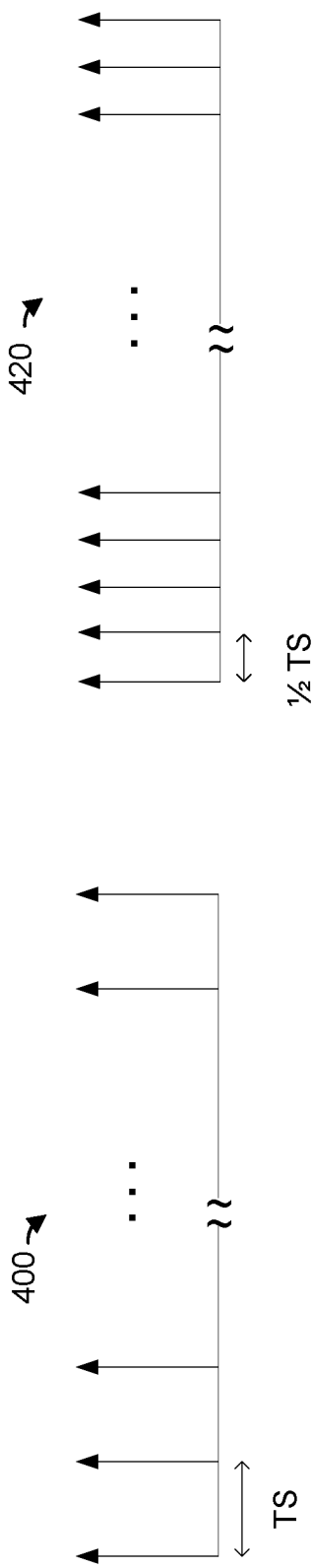
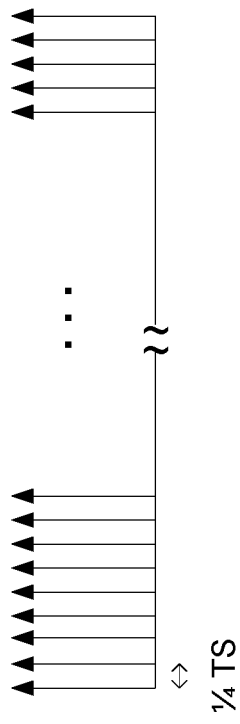

PACKET DURATION INDICATION IN A HIGH EFFICIENCY WIRELESS LOCAL AREA NETWORK (WLAN)

CROSS-REFERENCES TO RELATED APPLICATIONS

This application is a continuation of U.S. patent application Ser. No. 14/688,884, now U.S. Pat. No. 10,044,476, entitled "Signal Field Length Indication in a High Efficiency Wireless Local Area Network (WLAN)," filed on Apr. 16, 2015, which claims the benefit of U.S. Provisional Patent Application No. 61/980,417, entitled "L-SIG LENGTH Field Design for HEW," filed on Apr. 16, 2014, U.S. Provisional Patent Application No. 62/012,930, entitled "L-SIG LENGTH Field Design for HEW," filed on Jun. 16, 2014, U.S. Provisional Patent Application No. 62/114,232, entitled "L-SIG LENGTH Field Design for HEW," filed on Feb. 10, 2015, and U.S. Provisional Patent Application No. 62/138,148, entitled "L-SIG LENGTH Field Design for HEW," filed on Mar. 25, 2015. All of the applications referenced above are incorporated herein by reference in their entireties.

The present application is also related to U.S. patent application Ser. No. 14/688,859, entitled "Signal Field Length Indication in a High Efficiency Wireless Local Area Network (WLAN)," filed on Apr. 16, 2015, which is incorporated by reference herein in its entirety.

FIELD OF THE DISCLOSURE

The present disclosure relates generally to communication networks and, more particularly, to wireless local area networks that utilize orthogonal frequency division multiplexing (OFDM).

BACKGROUND

When operating in an infrastructure mode, wireless local area networks (WLANs) typically include an access point (AP) and one or more client stations. WLANs have evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughputs, such as throughputs in the tens of Gbps range.

SUMMARY

In an embodiment, a method for generating a physical layer (PHY) data unit for transmission via a communication channel includes generating a first set of orthogonal frequency domain multiplexing (OFDM) symbols for a first portion of the PHY data unit, wherein OFDM symbols of the first set of OFDM symbols are generated with a first OFDM tone spacing, and generating a second set of OFDM symbols for a second portion of the PHY data unit, wherein at least some OFDM symbols of the second set of OFDM symbols are generated with a second tone spacing different from the first tone spacing. The method further includes determining, based on the first tone spacing and the second tone spacing, a value for a length indicator indicative of a duration of the PHY data unit. The method further still includes generating the first portion of the PHY data unit to include (i) the first set of OFDM symbols and (ii) the length indicator set to the determined value, and generating the second portion of the PHY data unit to include the second set of OFDM symbols. The method additionally includes generating the PHY data unit to include the first portion and the second portion.

In another embodiment, an apparatus comprises a network interface configured to generate a first set of orthogonal frequency domain multiplexing (OFDM) symbols for a first portion of a physical layer (PHY) data unit, wherein OFDM symbols of the first set of OFDM symbols are generated with a first OFDM tone spacing, and generate a second set of OFDM symbols for a second portion of the PHY data unit, wherein at least some OFDM symbols of the second set of OFDM symbols are generated with a second tone spacing different from the first tone spacing. The network interface is further configured to determine, based on the first tone spacing and the second tone spacing, a value for a length indicator indicative of a duration of the PHY data unit. The network interface is further still configured to generate the first portion of the PHY data unit to include (i) the first set of OFDM symbols and (ii) the length indicator set to the determined value, and generate the second portion of the PHY data unit to include the second set of OFDM symbols. The network interface is additionally configured to generate the PHY data unit to include the first portion and the second portion.

In yet another embodiment, a method for processing a physical layer (PHY) data unit includes receiving the PHY data unit via an orthogonal frequency division multiplexing (OFDM) communication channel. The PHY data unit includes (i) a first set of one or more short OFDM symbols generated using a normal tone spacing and (ii) a second set of one or more long OFDM symbols generated using a reduced tone spacing, (iii) an OFDM symbol indicator indicative of a number of OFDM symbols in at least one of (a) the first set of OFDM symbols and (b) the second set of OFDM symbols; The method additionally includes determining, based at least in part on the OFDM symbol indicator, (i) a number of short OFDM symbols in the set of one or more short OFDM symbols and (ii) a number of long OFDM symbols in the set of one or more long OFDM symbols.

In still another embodiment, an apparatus comprises a network interface configured to receive a physical layer (PHY) data unit via an orthogonal frequency division multiplexing (OFDM) communication channel. The PHY data unit includes (i) a first set of one or more short OFDM symbols generated using a normal tone spacing and (ii) a second set of one or more long OFDM symbols generated using a reduced tone spacing, (iii) an OFDM symbol indicator indicative of a number of OFDM symbols in at least one of (a) the first set of OFDM symbols and (b) the second set of OFDM symbols. The network interface is further configured to determine, based at least in part on the OFDM symbol indicator, (i) a number of short OFDM symbols in the set of one or more short OFDM symbols and (ii) a number of long OFDM symbols in the set of one or more long OFDM symbols.

BRIEF DESCRIPTION OF THE DRAWINGS

FIGS. 4A-4C are diagrams illustrating OFDM tone spacing used with OFDM symbols of a data unit, according to several embodiments;

DETAILED DESCRIPTION

Figure 1:
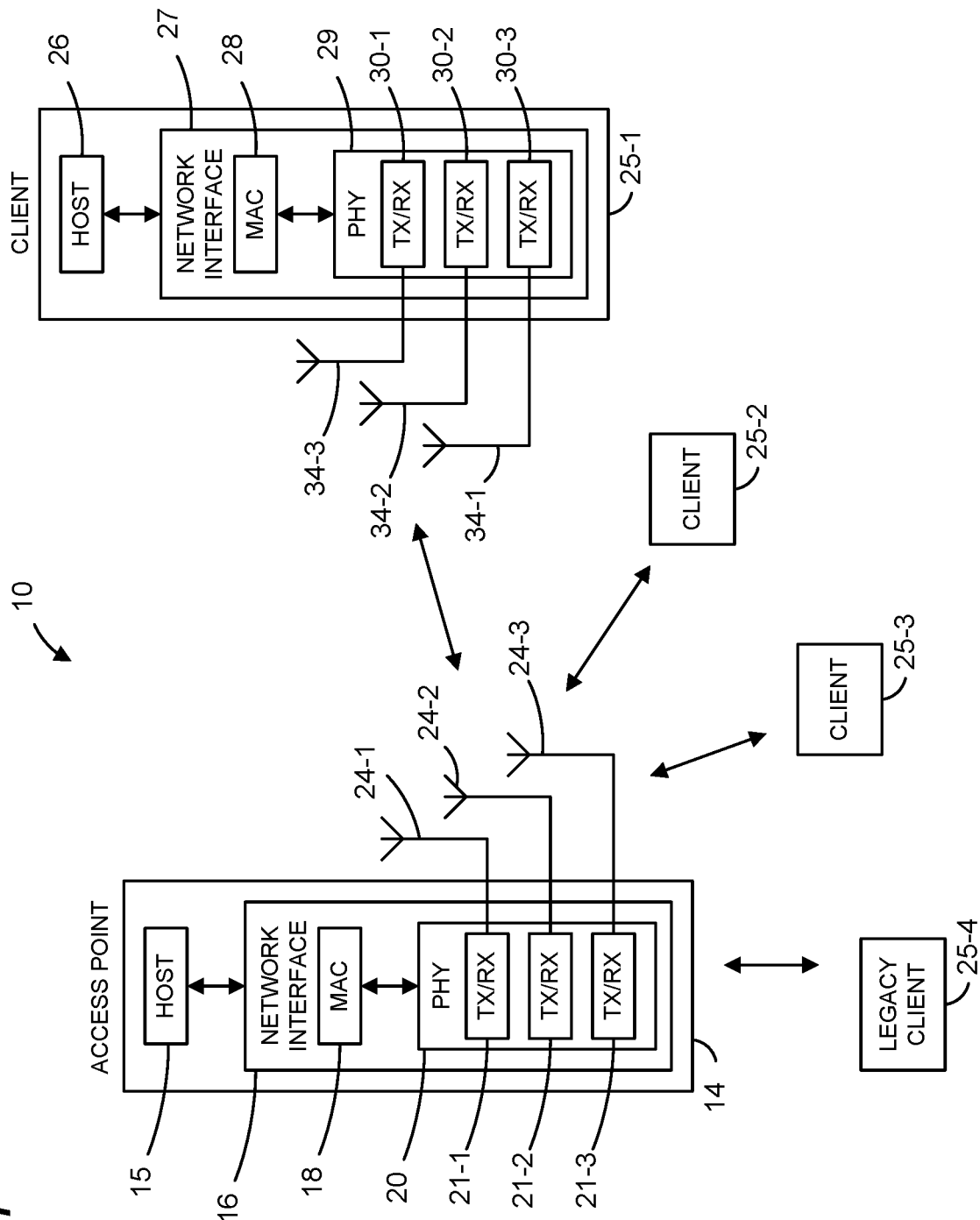
FIG. 1 is a block diagram of an example wireless local area network (WLAN), according to an embodiment.

In embodiments described below, a wireless network device such as an access point (AP) of a wireless local area network (WLAN) transmits data streams to one or more client stations. The AP is configured to operate with client stations according to at least a first communication protocol. The first communication protocol is sometimes referred to herein as "high efficiency Wi-Fi," "HEW" communication protocol, or 802.11ax communication protocol. In some embodiments, different client stations in the vicinity of the AP are configured to operate according to one or more other communication protocols which define operation in the same frequency band as the HEW communication protocol but with generally lower data throughputs. The lower data throughput communication protocols (e.g., IEEE 802.11a, IEEE 802.11n, and/or IEEE 802.11ac) are collectively referred herein as "legacy" communication protocols. In at least some embodiments, the legacy communication protocols are generally deployed in indoor communication channels, and the HEW communication protocol is at least sometimes deployed for outdoor communications, extended range communications, or communications in areas with reduced signal-to-noise ratios (SNR) of transmitted signals.

In an embodiment, an orthogonal frequency division multiplexing (OFDM) data unit that conforms to the HEW communication protocol includes a first set of OFDM symbols generated with a first OFDM tone spacing and a second set of OFDM symbols generated using a second OFDM tone spacing that is smaller than the first OFDM tone spacing. For example, in an embodiment, the first set of OFDM symbols utilizes a "normal" tone spacing defined in the legacy communication protocols, and the second set of OFDM symbols utilizes a "reduced" tone spacing that is a fraction of the normal tone spacing, such as, for example, ½ of the normal tone spacing or ¼ of the normal tone spacing, in various embodiments. In an embodiment, a portion of the data unit is decodable by a legacy communication device that is configured according to a legacy communication protocol but not the first communication protocol. The portion of the data unit that is decodable by a legacy communication device includes a length indication indicative of a duration of the data unit. A legacy device that receives the data unit decodes the duration provided in the decodable portion of the data unit, and refrains from transmitting in the communication medium for the duration of the data unit, thereby protecting transmission of the data unit. In an embodiment, the value for the length indication is computed at the device that transmits the data unit "transmitting device," based on the first tone spacing used with the first set of OFDM symbols and the second tone spacing, such that a legacy communication device that is receiving the data unit ("receiving device") can determine at least approximate duration of the data unit. A legacy device that receives the data unit decodes the duration provided in the decodable portion of the data unit, and refrains from transmitting in the communication medium for the duration of the data unit, thereby protecting transmission of the data unit Additionally, the value of the length indicator in the first portion of the data unit allows a communication device that conforms to the HEW communication protocol to determine the number of OFDM symbols in the data unit, in an embodiment.

FIG. 1 is a block diagram of an example wireless local area network (WLAN) 10, according to an embodiment. An AP 14 includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 includes other suitable numbers (e.g., 1, 2, 4, 5, etc.) of transceivers 21 and antennas 24 in other embodiments. In one embodiment, the MAC processing unit 18 and the PHY processing unit 20 are configured to operate according to a first communication protocol (e.g., HEW communication protocol). In another embodiment, the MAC processing unit 18 and the PHY processing unit 20 are also configured to operate according to a second communication protocol (e.g., IEEE 802.11ac Standard). In yet another embodiment, the MAC processing unit 18 and the PHY processing unit 20 are additionally configured to operate according to the second communication protocol, a third communication protocol and/or a fourth communication protocol (e.g., the IEEE 802.11a Standard and/or the IEEE 802.11n Standard).

The WLAN 10 includes a plurality of client stations 25. Although four client stations 25 are illustrated in FIG. 1, the WLAN 10 includes other suitable numbers (e.g., 1, 2, 3, 5, 6, etc.) of client stations 25 in various scenarios and embodiments. At least one of the client stations 25 (e.g., client station 25-1) is configured to operate at least according to the first communication protocol. In some embodiments, at least one of the client stations 25 is not configured to operate according to the first communication protocol but is configured to operate according to at least one of the second communication protocol, the third communication protocol and/or the fourth communication protocol (referred to herein as a "legacy client station").

The client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 includes other suitable numbers (e.g., 1, 2, 4, 5, etc.) of transceivers 30 and antennas 34 in other embodiments.

According to an embodiment, the client station 25-4 is a legacy client station, i.e., the client station 25-4 is not enabled to receive and fully decode a data unit that is transmitted by the AP 14 or another client station 25 according to the first communication protocol. Similarly, according to an embodiment, the legacy client station 25-4 is not enabled to transmit data units according to the first communication protocol. On the other hand, the legacy client station 25-4 is enabled to receive and fully decode and transmit data units according to the second communication protocol, the third communication protocol and/or the fourth communication protocol.

In an embodiment, one or both of the client stations 25-2 and 25-3, has a structure the same as or similar to the client station 25-1. In an embodiment, the client station 25-4 has a structure similar to the client station 25-1. In these embodiments, the client stations 25 structured the same as or similar to the client station 25-1 have the same or a different number of transceivers and antennas. For example, the client station 25-2 has only two transceivers and two antennas, according to an embodiment.

In various embodiments, the PHY processing unit 20 of the AP 14 is configured to generate data units conforming to the first communication protocol and having formats described herein. The transceiver(s) 21 is/are configured to transmit the generated data units via the antenna(s) 24. Similarly, the transceiver(s) 24 is/are configured to receive the data units via the antenna(s) 24. The PHY processing unit 20 of the AP 14 is configured to process received data units conforming to the first communication protocol and having formats described hereinafter and to determine that such data units conform to the first communication protocol, according to various embodiments.

In various embodiments, the PHY processing unit 29 of the client device 25-1 is configured to generate data units conforming to the first communication protocol and having formats described herein. The transceiver(s) 30 is/are configured to transmit the generated data units via the antenna(s) 34. Similarly, the transceiver(s) 30 is/are configured to receive data units via the antenna(s) 34. The PHY processing unit 29 of the client device 25-1 is configured to process received data units conforming to the first communication protocol and having formats described hereinafter and to determine that such data units conform to the first communication protocol, according to various embodiments.

Figure 2:
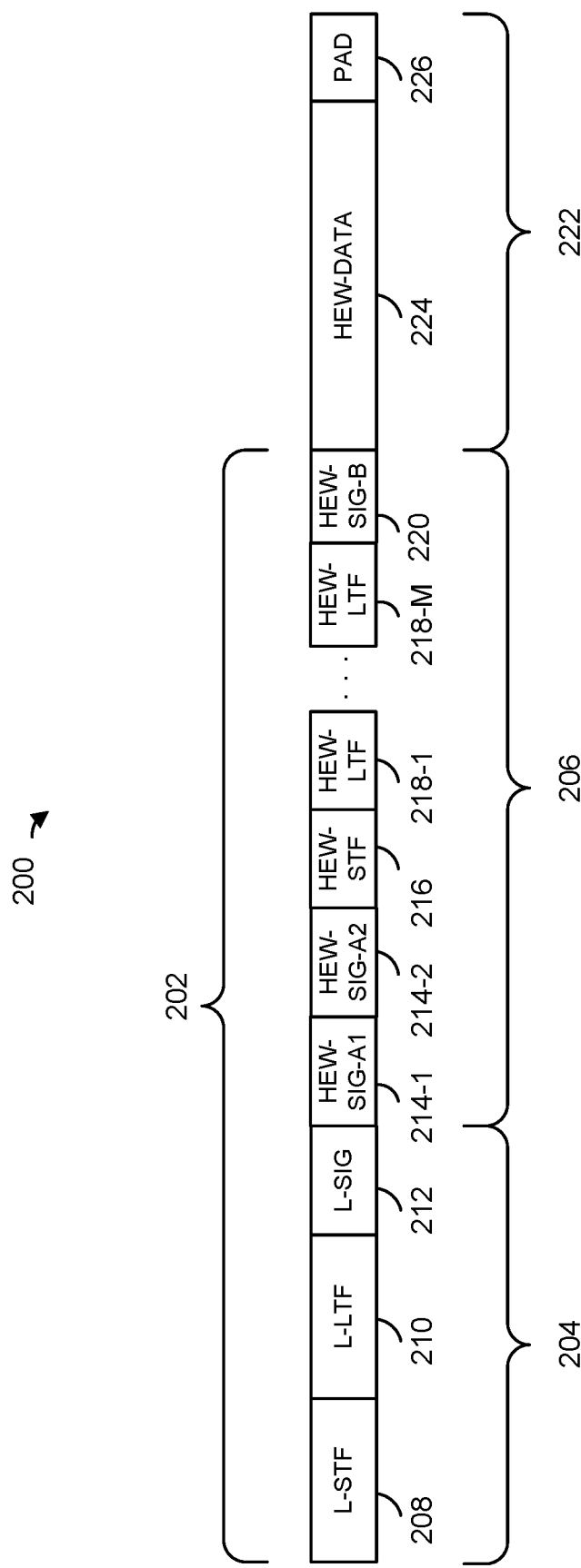
FIG. 2 is a diagram of an OFDM data unit, according to an embodiment.

FIG. 2 is a diagram of an OFDM data unit 200 that the AP 14 is configured to transmit to the client station 25-1 via orthogonal frequency domain multiplexing (OFDM) modulation, according to an embodiment. In an embodiment, the client station 25-1 is also configured to transmit the data unit 200 to the AP 14. The data unit 200 conforms to the HEW communication protocol and occupies a 20 MHz bandwidth. Data units similar to the data unit 200 occupy other suitable bandwidth such as 40 MHz, 80 MHz, 160 MHz, 320 MHz, 640 MHz, for example, or other suitable bandwidths, in other embodiments. The data unit 200 is suitable for "mixed mode" situations, i.e. when the WLAN 10 includes a client station (e.g., the legacy client station 24-4) that conforms to a legacy communication protocol, but not the first communication protocol. The data unit 200 is utilized in other situations as well, in some embodiments.

The data unit 200 includes a preamble 202, which, in turn, includes a legacy preamble portion 204 and a high efficiency WLAN (HEW) preamble portion 206. The legacy preamble portion 202 includes an L-STF 208, an L-LTF 210, and an L-SIG 212. The HEW preamble portion 206 includes two first HEW signal fields (HEW-SIGAs) 214 including a first HEW signal field (HEW-SIGA1) 214-1 and a second HEW signal field (HEW-SIGA2) 214-2, an HEW short training field (HEW-STF) 216, M HEW long training fields (HEW-LTFs) 218, where M is an integer, and a third HEW signal field (HEW-SIGB) 220. Each of the L-STF 208, the L-LTF 210, the L-SIG 212, the HEW-SIGAs 215, the HEW-STF 216, the M HEW-LTFs 218, and the HEW-SIGB 220 comprises an integer number of one or more OFDM symbols. For example, in an embodiment, the HEW-SIGAs 214 comprise two OFDM symbols, where the HEW-SIGA1 214-1 field comprises the first OFDM symbol and the HEW-SIGA2 214-2 comprises the second OFDM symbol, in an embodiment. In at least some examples, the HEW-SIGAs 214 are collectively referred to as a single HEW signal field (HEW-SIGA) 214. The L-SIG 212, the HEW-SIGAs 214 and the HEW-SIGB 220 generally carry formatting information for the data unit 200, in an embodiment.

In some embodiments, the data unit 200 also includes a data portion 222. In some embodiments, the data portion 222 includes OFDM data symbols 224 and one or more padding OFDM symbols 226. The OFDM padding symbols 226 correspond to one or more last OFDM symbols of the data portion 222, in an embodiment. In an embodiment, a padding OFDM symbol includes at least some padding bits added at the end of the data portion 226. The data unit 200 omits the padding OFDM symbols 226, or omits the entire data portion 222, in some embodiments.

In the embodiment of FIG. 2, the data unit 200 includes one of each of the L-STF 208, the L-LTF 210, the L-SIG 212, and the HEW-SIGA1 s 214. In other embodiments in which an OFDM data unit similar to the data unit 200 occupies a cumulative bandwidth other than 20 MHz, each of the L-STF 208, the L-LTF 210, the L-SIG 212, the HEW-SIGA1 s 214 is repeated over a corresponding number of 20 MHz sub-bands of the whole bandwidth of the data unit, in an embodiment. For example, in an embodiment, the OFDM data unit occupies an 80 MHz bandwidth and, accordingly, includes four of each of the L-STF 208, the L-LTF 210, the L-SIG 212, the HEW-SIGA1 s 214, in an embodiment. In some embodiments, the modulation of different 20 MHz sub-bands signals is rotated by different angles. For example, in one embodiment, a first subband is rotated 0-degrees, a second subband is rotated 90-degrees, a third sub-band is rotated 180-degrees, and a fourth sub-band is rotated 270-degrees. In other embodiments, different suitable rotations are utilized. The different phases of the 20 MHz sub-band signals result in reduced peak to average power ratio (PAPR) of OFDM symbols in the data unit 200, in at least some embodiments. In an embodiment, if the data unit that conforms to the first communication protocol is an OFDM data unit that occupies a cumulative bandwidth such as 20 MHz, 40 MHz, 80 MHz, 160 MHz, 320 MHz, 640 MHz, etc., the HEW-STF, the HEW-LTFs, the HEW-SIGB and the HEW data portion occupy the corresponding whole bandwidth of the data unit.

In an embodiment, the legacy preamble portion 204 of the preamble 202 is decodable by legacy communication devices that conform to a legacy communication protocol, but do not conform to the first communication protocol. In an embodiment, a client station that conforms to a legacy communication protocol will recognize the legacy preamble portion 204 of the preamble 202 and will set the data unit duration according to a duration indicated in the L-SIG field 212 of the legacy preamble portion 204. For example, the legacy client station will calculate a duration based on a rate and a length (e.g., in number of bytes) indicated in the L-SIG field 212, according to an embodiment. In an embodiment, the rate and the length in the L-SIG field 212 are set such that a client station configured to operate according to a legacy communication protocol will calculate, based the rate and the length, a packet duration (T) that corresponds to, or at least approximates, the actual duration of the data unit 200.

For example, the rate is set to indicate a lowest rate defined by the IEEE 802.11a Standard (i.e., 6 Mbps), and the length is set to a value computed such that packet duration computed using the lowest rate at least approximates the actual duration of the data unit 200, in one embodiment.

In an embodiment, a legacy client station that conforms to the IEEE-802.11a Standard, when receiving the data unit 200, will compute a packet duration for the data unit 200, e.g., using a rate and a length fields of L-SIG field 212, and will wait until the end of the computed packet duration before performing clear channel assessment (CCA), in an embodiment. Thus, in this embodiment, communication medium is protected against access by the legacy client station at least for the duration of the data unit 200. In an embodiment, the legacy client station will continue decoding the data unit 200, but will fail an error check (e.g., using a frame check sequence (FCS)) at the end of the data unit 200.

Figure 3:
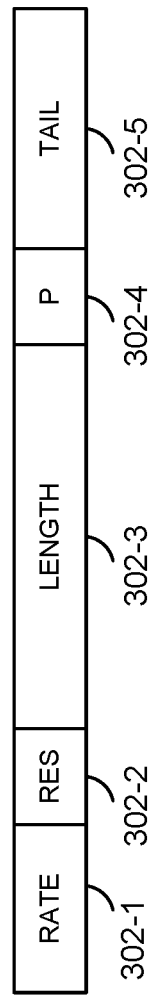
FIG. 3 is a diagram of a legacy signal field, according to an embodiment.

FIG. 3 is a diagram of a legacy signal field L-SIG 300, according to an embodiment. In an embodiment, the L-SIG field 300 is included in the data unit 200 of FIG. 2. For example, the L-SIG field 300 corresponds to the L-SIG field 212 of the data unit 200 of FIG. 2. In another embodiment, the L-SIG field 300 is included in a data unit different from the data unit 200 of FIG. 2. Similarly, the data unit 200 of FIG. 2 includes a legacy signal field different from the L-SIG field 300, in an embodiment. Merely for ease of explanation, the signal field L-SIG 300 is described below as being used as the signal field L-SIG 212 of the data unit 200 of FIG. 2

The L-SIG field 300 includes a plurality of subfield 302. In particular, the L-SIG field 300 includes a rate subfield 302-1, a reserved subfield 302-2, a length sub-field 302-3, a parity sub-field 302-4, and tail bits 306-5. In an embodiment, the rate sub-field 302-1 comprises 5 bits, the reserved sub-field 302-2 comprises a single reserved bit, the length sub-field 302-3 comprises 12 bits, the parity sub-field 302-4 includes a single parity bit, and the tail bits 302-5 comprise six tail bits. In an embodiment, the rate sub-field is set to indicate a rate of 6 Mbps to a legacy communication device that conforms to a legacy communication protocol but does not conform to the HEW communication protocol. The length sub-field 302-3 is set based on the actual length of the data 200, such that the legacy device can determine, using the rate of 6 Mbps as indicated by the rate sub-field 302-1, a packet duration that at least approximates the actual duration of the data unit 200.

FIGS. 4A-4C are diagrams illustrating OFDM tone spacing used with OFDM symbols of a data unit, such as the data unit 200 of FIG. 2, in some embodiments. Turning first to FIG. 4A, the tone spacing 400 corresponds to tone spacing defined in a legacy communication protocol (e.g., the IEEE 802-11n Standard or the IEEE 802-11ac Standard). For example, tone spacing 400 corresponds to the tone spacing defined in the IEEE 802.11a Standard, in an embodiment. In this embodiment, an OFDM symbol generated with the tone spacing 400 for a 20 MHz bandwidth is generated using a 64 point IFFT, resulting in the tone spacing (TS) of 312.5 kHz. Turning now to FIG. 4B, a tone spacing 420 is reduced by a factor of 2 (½) with respect to the tone spacing 400 of FIG. 4A. For example, continuing with the example above, whereas on OFDM symbol generated with the tone spacing 400 for a 20 MHz bandwidth is generated using a 64 point IFFT, an OFDM symbol generated with the tone spacing 420 for a 20 MHz bandwidth is generated using a 128 point IFFT, resulting in the ½ of the tone spacing 400 of FIG. 4A (i.e., 156.25 kHz). Similarly, turning now to FIG. 4C, a tone spacing 450 is reduced by a factor of 4 (¼) with respect to the tone spacing 400 of FIG. 4A. For example, continuing again with the example above, whereas on OFDM symbol generated with the tone spacing 400 for a 20 MHz bandwidth is generated using a 64 point IFFT, an OFDM symbol generated with the tone spacing 450 for a 20 MHz bandwidth is generated using a 256 point IFFT, resulting in the ¼ of the tone spacing 400 of FIG. 4A (i.e., 78.125 kHz). A tone spacing defined in a legacy communication protocol, such as the tone spacing 400 of FIG. 4A, is sometimes referred to herein as "normal tone spacing" and a tone spacing that is smaller than the tone spacing defined by the legacy communication protocol, such as the tone spacing 420 of FIG. 4B and the tone spacing 450 of FIG. 4C is sometimes referred to herein as "reduced tone spacing."

In an embodiment, a first set of OFDM symbols of the data unit 200 of FIG. 2 is generated with the tone spacing 400 of FIG. 4A. For example, at least OFDM symbols of the legacy preamble portion 204 are generated using the tone spacing 400 of FIG. 4A, in an embodiment. In an embodiment, one or more OFDM symbols of the HEW preamble portion 206 of the data unit 200 and/or one or more OFDM symbols of the HEW data portion 222 of the data unit 200, in addition to the OFDM symbols of the legacy preamble portion 204 of the data unit 200 are generated using the tone spacing 400 of FIG. 4A. Further, in an embodiment, a second set of OFDM symbols of the data unit 200 are generated using the tone spacing 420 of FIG. 4B or the tone spacing 450 of FIG. 4C, in an embodiment. For example, a particular tone spacing is selected for the second set of OFDM symbols based on factors such as characteristics of the communication channel in which the data unit 200 is to be transmitted, mode of deployment of the data unit 200, etc., as discussed above, in an embodiment. In another embodiment, only a single tone spacing is supported for the second set of OFDM symbols. For example, only the ¼ tone spacing 450 of FIG. 4C is supported, in an embodiment. In one such embodiment, tone spacing selection for the second set of OFDM symbols of the data unit 200 does not occur, but rather the ¼ tone spacing is always used for the second set of OFDM symbols. Alternatively, in another embodiment, either the tone spacing 400 of FIG. 4A or the tone spacing 450 of FIG. 4C is selected for the second set of OFDM symbols. Generally speaking, an OFDM symbol generated with a relatively smaller tone spacing is longer, in time duration, relative to an OFDM symbol generated with a relatively larger tone spacing. Thus, for example, an OFDM symbols generated with the tone spacing 450 of FIG. 4C is longer, in time duration, than an OFDM symbol generated with the tone spacing 420 of FIG. 4B, in an embodiment. Similarly, an OFDM symbols generated with the tone spacing 420 of FIG. 4B is longer, in time duration, than an OFDM symbol generated with the tone spacing 400 of FIG. 4A, in an embodiment.

Figure 5:
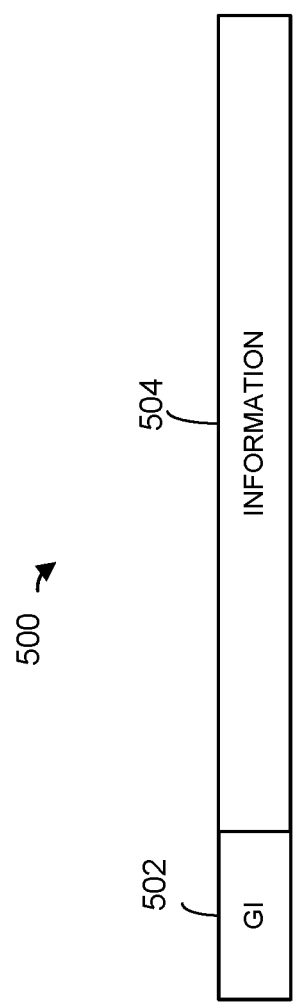
FIG. 5 is a diagram illustrating a guard interval used with an OFDM symbol of a data unit, according to an embodiment.

FIG. 5 is a diagram illustrating a guard interval used with an OFDM symbol of a data unit, such as the data unit 200 of FIG. 2, according to an embodiment. In an embodiment, a guard interval portion 502 is pre-pended to an information portion of the OFDM symbol 504. In an embodiment, the guard interval comprises a cyclic prefix repeating an end portion of the information portion 504. In an embodiment, the guard interval portion 502 is used to ensure orthogonality of OFDM tones at a receiving device (e.g., the client station 25-1) and to minimize or eliminate inter-symbol interference due to multi-path propagation in the communication channel via which the OFDM symbol is transmitted. In an embodiment, the length of the guard interval portion 502 is selected based on expected worst case channel delay spread in the communication channel between the transmitting device and the receiving device. For example, a longer guard interval is selected for outdoor communication channels typically characterized by longer channel delay spreads as compared to a shorter guard interval selected for indoor communication channels typically characterized by shorter channel delay spreads, in an embodiment.

According to an embodiment, the length of the guard interval portion 502 to be used with particular OFDM symbols of the data unit 200 is selected from a set of guard intervals supported by the HEW communication protocol. For example, the set of guard intervals supported by the HEW communication protocol includes 0.4 µs, 0.8 µs, 1.6 µs, and 3.2 µs guard intervals. In other embodiment, the set of guard intervals supported by the HEW communication protocol exclude one or more of 0.4 µs, 0.8 µs, 1.6 µs, and 3.2 µs and/or include one or more suitable guard intervals other than 0.4 µs, 0.8 µs, 1.6 µs, and 3.2 µs instead of or in addition to the guard intervals 0.4 µs, 0.8 µs, 1.6 µs, and 3.2 µs. In an embodiment, in accordance with terminology used in a legacy communication protocol (e.g., the IEEE 802-11n Standard or the IEEE 802-11 ac Standard), a guard interval of 0.8 µs is sometimes referred to herein as a "normal guard interval" and a guard interval of 0.4 µs is sometimes referred to herein as "short guard interval."

In an embodiment, a particular tone spacing and/or a particular guard interval is selected for at least some OFDM symbols of the data unit 200 depending on one or more factors such as the mode of deployment of the data unit 200 (e.g., whether the data unit 200 is to be transmitted indoors or outdoors, whether the data unit 200 is communicated between non-moving devices or devices moving with relatively slow speeds, etc.), characteristics and/or channel conditions of the communication channel in which the data unit 200 is to be transmitted, etc. For example, in an embodiment, a shorter guard interval and/or a larger tone spacing is selected for at least some OFDM symbols of the data unit 200 when the data unit 200 is to be transmitted in a communication channel characterized by shorter channel delay spreads (e.g., indoor communication channels), while a longer guard interval and/or a smaller tone spacing is selected for at least some OFDM symbols of the data unit 200 when the data unit 200 characterized by relatively longer channel delay spreads (e.g., outdoor communication channels).

In at least some embodiments and/or scenarios, OFDM symbols of a first set of one or more OFDM symbols of the data unit 200 are generated using a first tone spacing and/or a first guard interval, and OFDM symbols of a second set of one or more OFDM symbols are generated using a second tone spacing and/or a second guard interval. For example, OFDM symbols of the legacy portion 204 of the preamble 202 are generated using the normal spacing and a legacy guard interval (e.g., the normal guard interval), while the HEW preamble portion 206 and the data portion 222 are generated using a tone spacing different from the legacy guard interval and/or a guard interval different from the legacy guard interval, in an embodiment. In another embodiment, one or more OFDM symbols of the HEW preamble portion 206 and the data portion 222 are generated using the legacy tone spacing in addition of the OFDM symbols of the legacy preamble portion 204. For example OFDM symbols of one or more of the HEW-SIGA field 214, the HEW-LTF(s) 218 and the padding OFDM symbols 226 of the data field 222 are generated using the normal tone spacing, while OFDM symbols of the HEW-STF field 216, the HEW-SIGB 220 and the data portion 222 are generated using a tone spacing different from the legacy guard interval and/or a guard interval different from the normal guard interval, in an embodiment.

In an embodiment, the actual duration of the data unit 200 depends on the duration of each OFDM symbol included in the data unit 200. The duration of each OFDM symbol is determined by the tone spacing and the guard interval used to generate the OFDM symbol, in embodiments. Consequently, the value of the length subfield in the L-SIG field 212 of the data unit 200 is a function of the tone spacing options and the guard intervals selected for the OFDM symbols of the data unit 200, in an embodiment. In an embodiment, the value of the length field 302-3 is determined according to $$\text{L\_LENGTH} = \left\lceil \frac{TXTIME - 20}{4} \right\rceil \times 3 - 3 \qquad \text{Equation 1}$$

where TXTIME is the actual transmission time of the data unit, and ⌈ ⌉ denotes an integer ceiling operation. In an embodiment, TXTIME for the data unit is a function of a number of OFDM symbols in the data unit, and duration of each of the OFDM symbols in the data unit. Accordingly, in an embodiment and/or scenario in which the data unit 200 includes OFDM symbols with different tone spacing options, TXTIME is calculated using different symbol durations corresponding to the different tone spacing options. In an embodiment, OFDM symbol duration is calculated according to $$T_{HEW} = \frac{3.2 \ \mu s}{r_{TS}} + GI \qquad \text{Equation 2}$$

wherein $r_{TS}$ is the tone spacing factor with respect to the normal tone spacing, such as tone spacing of 312.5 kHz, for example, and GI is the length of the guard interval being used for the particular OFDM symbol. Further, in an embodiment, TXTIME in Equation 2 is determined using OFDM symbol duration, given in Equation 2, according to $$TXTIME = T_{L\_PREAMBLE} + T_{L\_SIG} + T_{HEW\_PREMABLE} + T_{HEW\_SIGH} + T_{HEW} \times N_{SYM} + T_{HEW\_PADDING} \qquad \text{Equation 3}$$

Referring FIG. 2 and Equation 3, $T_{L\_PREAMBLE}$ is the duration of the legacy training fields of the legacy portion 204 of the preamble 202, in an embodiment. Accordingly, $T_{L\_PREAMBLE}$ includes the duration of the L-STF field 208, the duration of the L-LTF field 210, in an embodiment. $T_{L\_SIG}$ is a duration of the legacy signal field L-SIG 212 of the legacy preamble portion 204 of the preamble 202, in an embodiment. In an embodiment in which OFDM symbols of the legacy training fields of the legacy preamble portion 204 are generated using the legacy tone spacing of 312.5 kHz and guard interval of 0.8 µs, $T_{L\_PREAMBLE} + T_{L\_LSIG} = 20$ µs. In other embodiments, one or more OFDM symbols of the legacy preamble portion 204 are generated using tone spacing other than 312.5 kHz and/or using guard interval other than 0.8 µs, resulting in $T_{L\_PREAMBLE} + T_{L\_SIG}$ duration other than 20 µs.

With continued reference to FIG. 2 and Equation 3, $T_{HEW\_PREMABLE}$ includes the duration of the signal field A HEW-SIGA 214 and the duration of training fields HEW-STF 216 and HEW-LTFs 218, in an embodiment. Further, $T_{L\_SIG}$ corresponds to the duration of the legacy signal field L-SIG 212, $T_{HEW\_SIGB}$ corresponds to the duration of the HEW-SIGB field 220, $T_{HEW} \times N_{SYM}$ corresponds to the duration of the HEW data portion 222, and $T_{HEW\_PEDDING}$ corresponds to the duration of the padding OFDM symbols 226, in an embodiment. In an embodiment, the particular values of $T_{HEW\_PREMABLE}$, $T_{HEW\_SIGB}$, $T_{HEW} \times N_{SYM}$, and $T_{HEW\_PADDING}$ are determined based on the tone spacing and the guard interval used with the corresponding OFDM symbols of the data unit 200.

Figure 6:
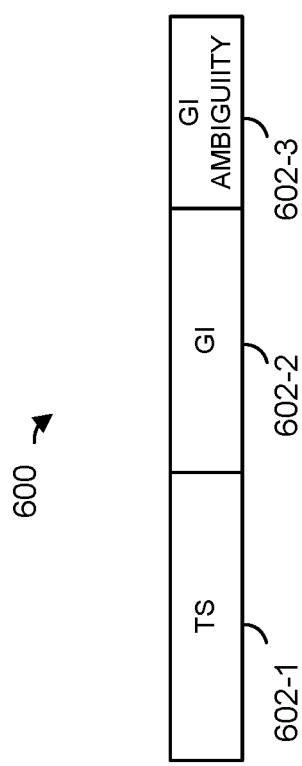
FIG. 6 is a block diagram of a tone spacing and/or guard interval indication field, according to an embodiment.

In an embodiment, the data unit 200 includes tone spacing and/or guard interval (TSGI) indication to indicate the tone spacing and the guard interval used for the second set of OFDM symbols, in an embodiment. The TSGI indication allows a receiving device that conforms to the HEW communication protocol to determine the number of OFDM symbols in the data unit 200 based on the value of the length subfield in the L-SIG field 212 of the data unit 200, in an embodiment. FIG. 6 is a block diagram of a TSGI indication field 600, according to an embodiment. In an embodiment, the TSGI indication field 600 is included in the HEW-SIGA field 214 of the data unit 200. The TSGI indication field 600 includes a tone spacing indication sub-field 602-1 and a guard interval subfield 602-2 and, accordingly, is capable of indicating a maximum of four tone spacing and guard interval options, respectively, in an embodiment. In an embodiment, each of the tone spacing indication sub-field 602-1 and the guard interval subfield 602-2 comprises two bits. As just an example, a value of 00 of the tone spacing sub-field 602-1 indicates that the normal tone spacing (e.g., the tone spacing 400 of FIG. 4A) is used for the second set of OFDM symbols, a value of 01 of the tone spacing sub-field 602-1 indicates that a tone spacing that is ½ of the normal tone spacing (e.g., the tone spacing 420 of FIG. 4B) is used for the second set of OFDM symbols, a value of 10 of the tone spacing sub-field 602-1 indicates that a tone spacing that is ¼ of the normal tone spacing (e.g., the tone spacing 450 of FIG. 4C) is used for the second set of OFDM symbols, and the value of 11 of the tone spacing sub-field 602-1 is not used, or reserved. In an embodiment, a value of 00 of the guard interval sub-field 602-2 indicates that the guard interval of 0.4 μs is used for the second set of OFDM symbols, a value of 01 of the guard interval sub-field 602-2 indicates that the guard interval of 0.8 μs is used for the second set of OFDM symbols, a value of 10 of the guard interval sub-field 602-2 indicates that the guard interval of 1.6 μs is used for the second set of OFDM symbols, and the value of 11 of the tone spacing sub-field 602-1 indicates that the guard interval of 3.2 μs is used for the second set of OFDM symbols, in an embodiment. The TSGI indication field also includes a single bit GI ambiguity sub-field 602-3, in an embodiment. The GI ambiguity sub-field 602-3 is used to disambiguate a calculation of the number of OFDM symbols in a data unit when the number of OFDM symbols is calculated at a receiving device based on a value of a legacy length sub-field (e.g., the length sub-field 302-3) when the value of the legacy sub-field is calculated according to Equation 1. For example, in an embodiment, to disambiguate a calculation of the number of OFDM symbols in a data unit when the number of OFDM symbols is calculated at a receiving device based on a value of a legacy length sub-field, the GI ambiguity sub-field 602-3 is set to 0 if the number of OFDM symbols Nsym in the data unit satisfies the condition that Nsym % 10!=9, and is set to 1 if the number of OFDM symbols Nsym in the data unit satisfies the condition that Nsym % 10==9, in an embodiment.

In an embodiment, a communication device that conforms to the HEW communication protocol, when receiving the data unit 200, determines a number of OFDM symbols in the data unit 200 based on the value of the length indication in L-SIG field 212 of the data unit 200, and using a TSGI indication in the HEW-SIGA field 214 of the data unit 200. For example, in an embodiment, when the length indication in L-SIG field 212 is determined at the transmitting device according to Equation 1, the receiving device determines the number of OFDM symbols according to $$N_{SYM} = \left\lceil \left( \frac{L - \text{LENGTH} + 3}{3} \times 4 - T_{HEW\_PREAMBLE} - T_{HEW\_SIGB} \right) \middle/ T_{HEW} - 1 \right\rceil \quad \text{Equation 4}$$

or according to $$N_{SYM} = \left\lceil \left( \frac{L - \text{LENGTH} + 3}{3} \times 4 - T_{HEW\_PREAMBLE} - T_{HEW\_SIGB} \right) \middle/ T_{HEW} \right\rceil \quad \text{Equation 5}$$

In particular, in an embodiment, the receiving device utilizes Equation 4 to determine the number of symbols Nsym when the TSGI indication indicates that the normal tone spacing and the guard interval of 0.4 μs is used for the second set of OFDM symbols and the GI ambiguity bit of the TSGI indication is set to 0 (e.g., when the TSGI indication is set to the value 00000), or utilizes Equation 5 in other situations (e.g., when the TSGI indication is set to any value other than 0000). In either case, the receiving device determines the values of $T_{HEW\_PREAMBLE}$, $T_{HEW\_SIGB}$ and $T_{HEW}$ in Equations 4 and 5 based on the particular tone spacing and the particular guard interval indicated by the corresponding bits of the TSGI indication in the data unit, in an embodiment.

In another embodiment, instead of using Equation 1 to determine the value of the length indication in L-SIG field 212, the transmitting device determines the value of the length indication in L-SIG field 212 according to $$\text{L\_LENGTH} = \left\lceil \frac{TXTIME - 20}{4} \times 3 \right\rceil - 3 \quad \text{Equation 6}$$

where TXTIME is the actual duration of the data unit 200, determined as described above with respect to Equation 1. As can be seen from a comparison of Equations 1 and 6, a rate conversion factor of 3 is applied to a time duration $$\left( \frac{TXTIME - 20}{4} \right)$$

before the ceiling operation is applied to the time duration in Equation 6 as compared to applying the conversion factor of 3 to the time duration after application of the ceiling operation in Equation 1. In this case, ambiguity of the number of OFDM symbols when the number of OFDM symbols is calculated at the receiving device does not arise, in an embodiment. Accordingly, a GI ambiguity indication is not needed, and is omitted from the TSGI indication, in an embodiment. For example, the GI ambiguity sub-field 602-3 is omitted from the TSGI indication field 600, in an embodiment. In an embodiment in which the GI ambiguity sub-field 602-3 is omitted from the TSGI indication field 600, the TSGI indication field 600 comprises only four bits as compared to the 5-bit TSGI indication field 600 described above. Further, in this embodiment, only a single equation is needed to calculate the number of OFDM symbols based on the value of the length indication in the L-SIG field 212 at the receiving device. In particular, the receiving device determines the number of OFDM according to Equation 4, in an embodiment.

As discussed above, in an embodiment, the HEW communication protocol supports only a single reduced tone spacing, in addition to the normal tone spacing. For example, the HEW communication protocol supports only a ¼ tone spacing in addition to the normal tone spacing. In one such embodiment, a transmitting device determines the value of the length indicator, based on the reduced tone spacing used with at least some OFDM symbols of the data unit 200, according to Equation 1. In another such embodiment, a transmitting device determines the value of the length indicator, based on the reduced tone spacing used with at least some OFDM symbols of the data unit 200, according to Equation 6. In either case, in such embodiments, the transmitting devices determines the duration of HEW fields of the data unit according to $$T_{HEW\_FIELDS} = T_{HEW\_PREAMBLE} + T_{HEW\_SYM} \times N_{SYM} = T_{HEW\_PREAMBLE} + (12.8 + GI) \times N_{HEW\_SYM} \quad \text{Equation 7}$$

In this embodiment, because only a single reduced tone spacing is supported by the HEW communication protocol, a tone spacing indication is not needed. In this case, referring to FIG. 6, the TS subfield 602-1 is not needed, and is omitted from the TSGI indication field 600, in an embodiment. Further, ambiguity of the number of OFDM symbols when the number of OFDM symbols is calculated at the receiving device does not arise, in this embodiment. Accordingly, a GI ambiguity indication is also not needed, and the GI ambiguity sub-field 602-3 is omitted from the TSGI indication field 600, in this embodiment.

Further, in this embodiment, only a single equation is needed to calculate the number of OFDM symbols based on the value of the length indication in the L-SIG field 212 at the receiving device. In particular, in an embodiment, the receiving device determines the number of OFDM according to $$N_{SYM} = \left\lfloor \left( \frac{L - \text{LENGTH} + 3}{3} \times 4 - T_{HEW\_PREAMBLE} \right) \middle/ (12.8 + GI) \right\rfloor \quad \text{Equation 8}$$

In another embodiment, some OFDM symbols of the HEW portion of the data unit 200 are "short OFDM symbols" generated using a relatively larger tone spacing (e.g., the normal tone spacing), while other OFDM symbols of the data unit 200 are "long OFDM symbols" generated using a relatively smaller tone spacing (e.g., a reduced tone spacing, such as a ¼ tone spacing). In an embodiment, the HEW communication protocol supports only a single reduced tone spacing (e.g., ¼ tone spacing), and the long OFDM symbols are generated using the single supported tone spacing. In at least some such embodiments, a first guard interval "$GI_{short}$" is used for the short OFDM symbols, and a second guard interval "$GI_{long}$" is used for the long OFDM symbols. In and embodiment, and HEW-SIG field, such as the HEW-SIGA field 214, includes an indication of the value of the guard interval GI used for the short OFDM symbols and an indication of the value of the guard interval $GI_{long}$ used for the long OFDM symbols. In an embodiment in which only a single reduced tone spacing is supported for use with the long OFDM symbols, a tone spacing indication is not needed. Accordingly, referring to FIG. 6, the TS subfield 602-1 is omitted from the indication field 600, in an embodiment. On the other hand, the GI subfield 602-2 is expanded to include indications of the value of the guard interval $GI_{short}$ used with the short OFDM symbols and an indication of the value of the guard interval $GI_{long}$ used with the long OFDM symbols, in an embodiment. In an embodiment, the GI subfield 602-2 is further expanded to include indications of the number of short OFDM symbols and/or the number of long OFDM symbols, as described in more detail below, in various embodiments.

In an embodiment, the GI subfield 602-2 includes indications of indications of the value of the guard interval $GI_{short}$ used for the short HEW OFDM symbols and an indication of the value of the guard interval $GI_{long}$ used for the long HEW OFDM symbols in the data unit 200, and additionally includes an indication of the number of short HEW OFDM symbols $N_{SYM\_Short}$ in the data unit 200. In this embodiment, a receiving device calculates a number of long HEW OFDM symbols $N_{SYM\_Long}$ in the data unit 200. In an embodiment, the receiving device calculates the number of long HEW OFDM symbols $N_{SYM\_Long}$ according to $$N_{SYM\_Long} = \left\lfloor \left( \frac{L - \text{LENGTH} + 3}{3} \times 4 - T_{HEW\_PREAMBLE} - (3.2 + GI_{Short}) \times N_{SYM\_Short} \right) \middle/ (12.8 + GI) \right\rfloor \quad \text{Equation 9}$$

In this embodiment, ambiguity of the number of OFDM symbols when the number of OFDM symbols is calculated at the receiving device does not arise, in this embodiment. Accordingly, a GI ambiguity indication is not needed, in this embodiment. Referring to FIG. 6, the GI ambiguity subfield 602-2 is omitted from the indication field 602-3, in this embodiment.

In another embodiment in which short HEW OFDM symbols and long HEW OFDM symbols are used in the data unit 200, instead of signaling the number of short HEW OFDM symbols or the number of long HEW OFDM symbols in the data unit 200, respective ambiguity indications are included in the data unit 200 to indicate when ambiguity conditions are met when the number of short HEW OFDM symbols and the number of long HEW OFDM symbols are calculated at the receiving device that receives the data unit 200. For example, referring to FIG. 6, the GI ambiguity subfield 602-3 of the GI indication field 600 is expanded to include a first ambiguity bit Ambiguity$_{Long}$ indicative of ambiguity in calculating the number of short HEW OFDM symbols $N_{SYM\_Long}$, and a second ambiguity bit Ambiguity$_{Short}$ indicative of ambiguity in calculating the number of short HEW OFDM symbols $N_{SYM\_Short}$ In an embodiment, the transmitting device sets the Ambiguity$_{Long}$ bit to logic one (1) when a stored condition for long HEW OFDM symbol ambiguity is met for the data unit 200. Similarly, the transmitting device sets the Ambiguity$_{Short}$ bit to logic one (1) when a stored condition for short HEW OFDM symbol ambiguity is met for the data unit 200, in an embodiment. The stored conditions for long HEW OFDM symbol ambiguity and short HEW OFDM symbol ambiguity are based on various factors, such as one or more of (i) the particular values of $GI_{short}$ and $GI_{long}$ being utilized for the data unit 200, (ii) the number of HEW OFDM symbols in the data unit 200, (iii) the number of long HEW OFDM symbols in the data unit 200, (iv) the number of HEW OFDM symbols in the data unit 200, etc., in an embodiment.

In this embodiment, a receiving device that receives the data unit 200 calculates a number of long HEW OFDM symbols $N_{SYM\_Long}$ in the data unit 200 and a number of short HEW OFDM symbols $N_{SYM\_Short}$ in the data unit 200 based on the indications included in the data unit 200. In an embodiment, the receiving device calculates the number of long HEW OFDM symbols $N_{SYM\_Long}$ according to $$N_{SYM\_Long} = \left\lfloor \left( \frac{L-\text{LENGTH}+3}{3} \times 4 - T_{HEW\_PREAMBLE} \right) \middle/ (12.8 + GI_{Long}) \right\rfloor - \text{Ambiguity}_{Long} \quad \text{Equation 10}$$

and then calculates the number of long HEW OFDM symbols $N_{SYM\_Long}$ according to $$N_{SYM\_Short} = \left\lfloor \left( \frac{L-\text{LENGTH}+3}{3} \times 4 - T_{HEW\_PREAMBLE} - N_{SYM\_Long} \times (12.8 + GI_{Long}) \right) \middle/ (3.2 + GI_{Short}) \right\rfloor - \text{Ambiguity}_{Short} \quad \text{Equation 11}$$

In some embodiments described above, the value of the L_LENGTH indication included in the L-SIG field 212 of the data unit 200 is constrained to be a multiple of 3. For example, in embodiments in which the factor of 3 in the L_LENGTH indication value computation is applied to the time duration after the ceiling operator is applied to the time duration, such as when the value of the L_LENGTH indication is computed according to Equation 1, the value of L_LENGTH indication is constrained to be a multiple of 3 by virtue of applying the factor of 3 to an integer result of the ceiling operation. In some such embodiments, a non-legacy communication device receiving the data unit 200 assumes that the data unit 200 is a non-legacy data unit when the L_LENGTH indication value in the data unit is determined to be divisible by 3.

In some embodiments, the value of the L_LENGTH indication is constrained to be a multiple of a suitable integer other than 3 to allow a communication device that conforms to the HEW communication protocol to detect, based on the value of the L_LENGTH indication in the L_SIG field 212, that the data unit 200 conforms to the HEW communication protocol. For example, in some embodiments, the value of the L_LENGTH indication in the L_SIG field 212 is calculated according to $$\text{L\_LENGTH} = \left\lceil \frac{TXTIME-20}{4} \right\rceil \times 3 - 3 + n \quad \text{Equation 12}$$

where n is a suitable integer, such as n=1 or n=2, in embodiments. In an embodiment, a communication device that is configured according to the HEW communication protocol checks whether the value of the L_LENGTH subfield in the L_SIG field 212 is a multiple of 3 (e.g., mod(L_LENGTH, 3)=0). In an embodiment, if it is determined that the value of the L_LENGTH subfield in the L_SIG field 212 is not a multiple of 3, then the communication device decides that the data unit does not conform to the HT/VHT communication protocol. If the communication device determines that the data unit does not conform to the HT/VHT communication protocol, the communication device then determines whether the data unit conforms to a legacy communication protocol (e.g., the IEEE 802.11a Standard) or conforms to the HEW communication protocol based on an indication included in the HEW preamble portion of the data unit, in an embodiment.

In an embodiment in which the value of the L_LENGTH indication in the L_SIG field 212 is determined according to Equation 12, a receiving device that receives the data unit 200 calculates the number of OFDM symbols in the data unit 200 according to $$N_{SYM} = \left\lfloor \left( \frac{\text{L\_LENGTH}+3-n}{3} \times 4 \right) \middle/ T_{HEW} \right\rfloor \quad \text{Equation 13}$$

where n=1 or n=2, as described above.

Figure 7:
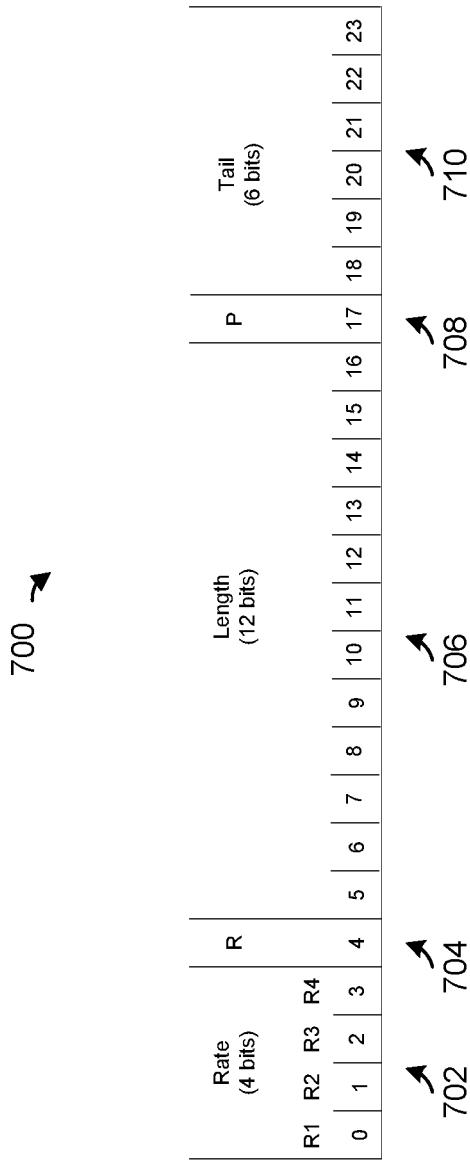
FIG. 7 is a diagram illustrating bit allocation of a legacy, according to an embodiment.

FIG. 7 is a diagram illustrating bit allocation of a legacy signal L_SIG field 700, such as the L_SIG field 212 of the data unit 200 of FIG. 2, according to an embodiment. In the embodiment of FIG. 7, the L_SIG field 700 includes a rate sub-field 702, a reserved sub-field 704, a length sub-field 706, a parity subfield 708 and tail bits 710. The rate in the rate subfield 702 and the length in the length subfield 706 are set as described above such that a legacy device can at least approximately determine a duration of the remainder of the data unit 200 after the legacy preamble portion 204, in various embodiments. In the embodiment illustrated in FIG. 7 the length subfield 706 comprises 12 bits. In an embodiment, the twelve bits of the length subfield 706 can represent a maximum packet length of 4,096 bytes.

Figure 8:
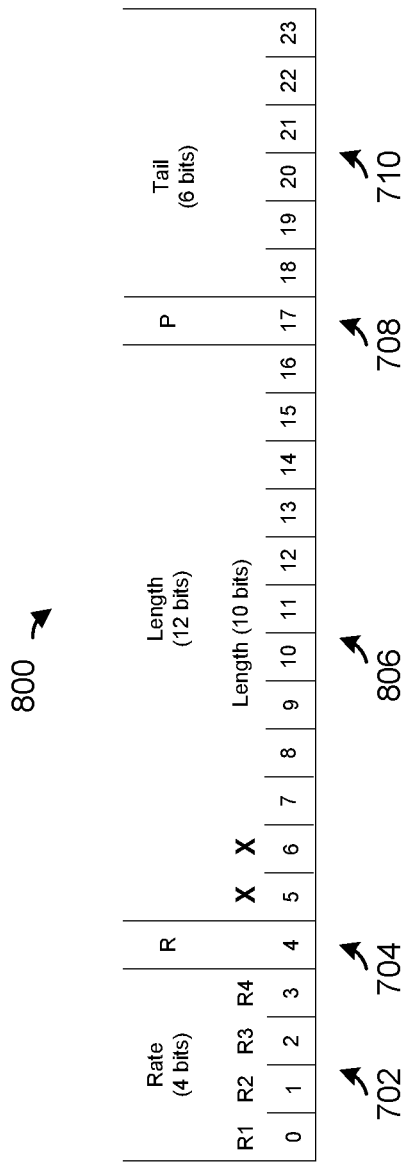
FIG. 8 is a diagram illustrating bit allocation of a legacy signal, according to another embodiment.

In some embodiments, the value of a length indication in a legacy signal field of a data unit is constrained to occupy one or more fewer bits compared to the number of bits allocated to length indication in the legacy communication protocol. In some such embodiment, the one or more bits that are not used for indicating length according to the HEW communication protocol are used for another purpose defined by the HEW communication protocol. For example, the one or more bits that are not used for indicating length according to the HEW communication protocol are used as additional error check bits to improve reliability of the legacy signal field, according to some embodiments. FIG. 8 is a diagram illustrating bit allocation of a legacy signal L_SIG field 800, such as the L_SIG field 212 of the data unit 200 of FIG. 2, according to an embodiment. Bit allocation of the L_SIG field 800 is similar to the bit allocation of the L_SIG field 700 illustrated in FIG. 7, except that in the L_SIG field 800, only ten bits of a 12-bit length subfield 806 are designated for indicating a length of the data unit, as compared to the entire twelve bits being designated for indicating a length of the data unit. In an embodiment, the remaining two bits (e.g., bit 5 and bit 6) of the length subfield 806 are used for a suitable purpose other than indicating a length of the data unit. For example, at least one of the remaining bits is used as an additional parity bit, in addition to the parity bit in the parity subfield 708, to improve reliability of the L_SIG field 800. In another embodiment, at least one of the bits of the length subfield 806 that are not designated for indicating length is used to signal to communication devices that conform to the HEW communication protocol that the data unit 200 conforms to the conform to the HEW communication protocol, to signal a particular HEW mode of the data unit 200, etc.

In an embodiment, to calculate the value of the length subfield 806, a transmitting device firth calculates L_LENGTH value according to $$L\_LENGTH = \left\lceil \frac{TXTIME - 20}{4} \right\rceil \times 3 - 3 \qquad \text{Equation 14}$$

as described above. Then, the transmitting device calculates a new L_LENGTH value based on the L_LENGTH value computed according to Equation 14. In an embodiment, the new L_LENGTH is determined according to $$L\_LENGTH = \left\lceil \frac{L\_LENGHT}{2^m} \right\rceil \times 2^m \qquad \text{Equation 15}$$

where m is an integer corresponding to the number of bits of the length subfield 806 that are not designated for indicating length, in an embodiment. For example m=1 in an embodiment in which 11 of the 12 length subfield bits are designated for indicating length, example m=2 in an embodiment in which 10 of the 12 length subfield bits are designated for indicating length, example m=3 in an embodiment in which 9 of the 12 length subfield bits are designated for indicating length, etc., in various embodiments. In at least some such embodiments (e.g., where m=1, m=2, or m=3), ambiguity of the number of OFDM symbols when the number of OFDM symbols is calculated at the receiving device does not arise, and no guard interval ambiguity bits are needed in the HEW portion 206 are needed.

In an embodiment, to calculate the number of OFDM symbols at the receiving devices, the (12-m) bits of the length subfield 806 that are designated for indicated length are extracted from the length subfield 806, and the extracted bits are padded with m zero bits to replace the bits of the length subfield 806 that are not designated for indicating length (e.g., the m least significant bits). Then, the number of HE OFDM symbols is calculated using the padded L_LENGTH bits, in an embodiment. More specifically, in an embodiment, the number of HE OFDM symbols is calculated according to $$N_{SYM} = \left\lceil \left( \frac{L\_LENGTH + 3}{3} \times 4 \right) / T_{HEW} \right\rceil \qquad \text{Equation 16}$$

In an more specific example, in an embodiment in which m=2, and, accordingly, two bits of the twelve bit length subfield 806 are designated to be used for a purpose other than indicating length, a length value L_LENGTH is first computed according to Equation 16, and a new length value L_LENGTH is then determined according to $$L\_Length = \left\lceil \frac{L\_LENGHT}{2^2} \right\rceil \times 2^2 \qquad \text{Equation 17}$$

As can be seen for Equation 17, in this case, the value of the length subfield 806 is constrained to be a multiple of four. Further, in an embodiment, if the value L_LENGTH satisfies mod(L_LENGTH, 6)==0, then the value of L_LENGTH is incremented by four (i.e., L_LENGTH+=4), in an embodiment.

Continuing with the example embodiment in which m=2, the two unused bits (e.g., the two least significant bits) of the length subfield 806 are used as error check bits of equal values, in an embodiment. For example, the two unused bits are set to logic one (11) if the value of the parity bit in the subfield 808 is a logic one (1), and are set to logic zero (00) if the value of the parity bit in the subfield 808 is a logic one (0), in an embodiment. In an embodiment, a receiving device configured according to the HEW protocol can detect that a data unit potentially conforms to the Hew communication protocol by detecting that the value L_LENGTH of the length subfield of the L_SIG field of the data unit is a multiple of 4 (e.g., if L_LENGTH % 3~=4). Then, the receiving device can check the values of the two unused bits (e.g., the least significant bits) of the length subfield of the data unit. If the two unused bits to not have a same value (e.g., if the two bits are not 00 or 11), then the receiving device determines that the L_LENGTH value was detected in error, or that the data unit does not conform to the HEW communication protocol. In this case, the receiving device stops processing the data unit, in an embodiment. Further, in an embodiment, if the two unused bits of the length subfield of the data unit have a same value (e.g., if the two bits are 00 or 11), then the receiving device additionally checks whether the value of the two unused bits corresponds to the value of the parity bit in the parity subfield 708. If the value of the two unused bits does not correspond to the value of the parity bit, the receiving device decides that the L-SIG field was received in error, or that the data unit does not conform to the HEW protocol. In this case, the receiving device stops processing the data unit, in an embodiment. On the other hand, if the value of the two unused bits corresponds to the value of the parity bit, the receiving device decides the data unit conforms to the HEW protocol and that the L-SIG field was not received in error. In this case, the receiving device continues processing the data unit, in an embodiment. Further, in this case, the receiving device determines the number of HE OFDM symbols in the data unit by masking the two unused bits of the length subfield of L-SIG (e.g., replacing the two unused bits with logic zero (00)) to obtain the value of L_LENGTH and then computing the number of OFDM symbols according to $$N_{SYM} = \left\lceil \left( \frac{L\_LENGTH + 3}{3} \times 4 \right) / T_{HEW} \right\rceil \qquad \text{Equation 18}$$

In another embodiment, the HEW portion 206 of the preamble 202 includes an indication HEW_LENGTH indicative of the length of the data unit 200. For example, the HEW-SIGA field 214 of the data unit 200 includes a length indication subfield HEW_LENGTH indicative of the length of the data unit 200. In an embodiment, a receiving does not use the length field included in the L-SIG field 212 to calculate the number of OFDM symbols in the data unit 200, but calculates the number of OFDM symbols in the data unit 200 based on the HEW_LENGTH indication included in the HEW portion 206, such as a length indication included in the HEW-SIGA field 214 of the data unit 200.

In an embodiment, the HEW_LENGTH length indication included in the HEW portion 206 indicates the number of OFDM symbols in the data unit 200. In an embodiment in which only a single reduced tone spacing is used of HEW OFDM symbols of the data unit 200, a single Nsym indication is included in the HEW preamble portion 204 of the data unit 200. The Nsym indication is set to indicate the number of OFDM symbols in the data unit 200, in this embodiment. As an example, in an embodiment, the Nsym indication included in the HEW portion 206 of the data unit 200 comprises nine bits. In this embodiment, the Nsym indication can indicate a maximum $2^{12}$ data bytes, or a maximum to $2^{10.4}$ OFDM symbols in the data unit 200. In another embodiment, in which both long HEW OFDM symbols and short HEW OFDM symbols are included in the data unit 200, respective Nsym_long and Nsym_short indications are included in the HEW portion 206 of the data unit 200. In any event, a receiving device that receives the data unit 200 can calculate the time duration TXTIME corresponding to the data unit 200 based on the Nsym indication and indications of the guard intervals GI$_{short}$ and/or GI$_{long}$ included in the data unit 200. For example, in an embodiment and scenario, the receiving device calculates TXTIME corresponding to the data unit 200 according to $$TXTIME = T_{HEW\_Long} + GI_{Long}) \times N_{SYM\_Long} + (T_{HEW\_Short} + GI_{Short}) \times N_{SYM\_Short} \qquad \text{Equation 19}$$

In another embodiment, the length indication included in the HEW portion 206 is set to indicate a length calculated, at the device that transmits the data unit 200, based on an actual length of the data unit 200 and based on a predetermined rate such that a receiving device can at least approximately determine the actual length of the data unit 200 and using the predetermined rate. For example, a predetermined rate of 6 Mbps is used, in some embodiments. In one such embodiment, the transmitting device determines the value of the HEW_LENGTH indication according to $$HEW\_LENGTH = \left\lceil \frac{TXTIME - 20}{4} \right\rceil - 3 \qquad \text{Equation 20}$$

Alternatively, in anther such embodiment, the transmitting device determines the value of the HEW_LENGTH indication according to $$HEW\_LENGTH = \left\lceil \frac{TXTIME - 20}{4} \times 3 \right\rceil - 3 \qquad \text{Equation 21}$$

In some embodiment, predetermined rates other than 6 Mbps are used for setting the HEW_LENGTH indication included in the data unit 200, and values of the HEW_LENGTH indication are determined such that a receiving device can at least approximately determine the actual length of the data unit 200 using the corresponding predetermined rates other than 6 Mbps. Generally speaking, with a relatively lower rate for setting the HEW_LENGTH indication included in the data unit 200, fewer bits are needed to signal HEW_LENGTH in the data unit 200. As just an example, in some embodiments, a predetermined rate of 3 Mbps is used. In one such embodiment, the transmitting device determines the value of the HEW_LENGTH indication according to $$HEW\_LENGTH = \left\lceil \frac{TXTIME - 20}{4} \right\rceil \times 3 - 3 \qquad \text{Equation 22}$$

Alternatively, in another such embodiment, the transmitting device determines the value of the HEW_LENGTH indication according to $$HEW\_LENGTH = \left\lceil \frac{TXTIME - 20}{8} \times 3 \right\rceil - 3 \qquad \text{Equation 23}$$

In such embodiments, in which the predetermined rate of 6 Mbps or the predetermined rate of 3 Mbps is used, ambiguity of the number of OFDM symbols when the number of OFDM symbols is calculated at the receiving device does not arise. A receiving device that receives the data unit 200 calculates the number of HEW OFDM symbols in the data unit 200, based on the HEW_LENGTH indication included in the data unit 200 according to $$N_{HEW\_SYM} = \left\lfloor \left( \frac{HEW\_LENGTH + 3}{3} \times M \right) / T_{HEW\_SYM} \right\rfloor \qquad \text{Equation 24}$$

where M=4 when the predetermined rate of 6 Mbps is used, and M=8 when the predetermined rate of 3 Mbps is used.

As yet another example, in another embodiment, a predetermined rate of 1.5 Mbps is used. In this embodiment, the HEW_LENGTH indication comprises two fewer bits compared to the number of bits needed for the HEW_LENGTH indication used with a predetermined rate of 6 Mbps. In one embodiment in which a predetermined rate of 1.5 Mbps is used, the transmitting device determines the value of the HEW_LENGTH indication according to $$HEW\_LENGTH = \left\lceil \frac{TXTIME - 20}{16} \right\rceil \times 3 - 3 \qquad \text{Equation 25}$$

In this embodiment, ambiguity arises when the number of OFDM symbols is calculated based on the value of the HEW_LENGTH indication in some situations. For example, if a guard interval of 0.4 μs is used with HEW OFDM symbols, ambiguity arises when the number of HEW OFDM symbols is in the set [5 11 17 22 28 34 39 45 . . . ]. Similarly, if a guard interval of 0.8 μs is used with HEW OFDM symbols, ambiguity arises when the number of HEW OFDM symbols is in the set [6 13 19 26 33 39 46 53 . . . ], in an embodiment. In an embodiment, the HEW preamble portion 206 (e.g., the HEW-SIGA field includes an ambiguity that is set based on an ambiguity table stored in the transmitting device. For example, based on the particular guard interval being utilized with HEW OFDM symbol, the ambiguity indication is set to a logic one (1) if the number of HEW OFDM symbols in the data unit is indicated in the ambiguity table as arising in ambiguity. On the other hand, the ambiguity indication is set to a logic zero (0) if the number of HEW OFDM symbols in the data unit is not indicated in the ambiguity table as arising in ambiguity, in an embodiment.

In an embodiment, a receiving device that receives the data unit 200 determines a number of HEW OFDM symbols in the data unit 200 based on (i) the indication of the guard interval being used with the HEW OFDM symbols and (ii) the GI ambiguity indication included in the HEW preamble portion 206 of the data unit 200. In an embodiment, the receiving device calculates the number of HEW OFDM symbols in the data unit 200 according to $$N_{HEW\_SYM} = \left\lfloor \left( \frac{HEW\_LENGTH + 3}{3} \times 16 \right) \Big/ T_{HEW\_SYM} \right\rfloor - \text{Ambiguity} \quad \text{Equation 26}$$

where the duration $T_{HEW\_SYM}$ is determined by the particular guard interval being utilized as indicated by the guard interval indication in the data unit 200, and Ambiguity is either 0 or 1 as indicated by the ambiguity indication in the data unit 200.

Alternatively, in another embodiment in which a predetermined rate of 1.5 Mbps is used, the value of the HEW_LENGTH indication is determined according to $$HEW\_LENGTH = \left\lceil \frac{TXTIME - 20}{16} \times 3 \right\rceil - 3 \quad \text{Equation 27}$$

In this embodiment, ambiguity of the number of OFDM symbols when the number of OFDM symbols is calculated at the receiving device does not arise. Accordingly, an ambiguity indication is not needed, in this embodiment. In this embodiment, a receiving device that receives the data unit 200 determines a number of HEW OFDM symbols in the data unit 200 based on the indication of the guard interval being used with the HEW OFDM symbols included in the HEW preamble portion 206 of the data unit 200. In an embodiment, the receiving device calculates the number of HEW OFDM symbols in the data unit 200 according to $$N_{HEW\_SYM} = \left\lfloor \left( \frac{HEW\_LENGTH + 3}{3} \times 16 \right) \Big/ T_{HEW\_SYM} \right\rfloor \quad \text{Equation 28}$$

where the duration $T_{HEW\_SYM}$ is determined based on the particular guard interval being utilized as indicated by the guard interval indication in the data unit 200.

In some embodiments, in which the HEW OFDM symbols of the data unit 200 include both short HEW OFDM symbols generated using a first tone spacing and long HEW OFDM symbols generated using a second tone spacing, and in which the value of the HEW_LENGTH indication is calculated based on a pre-determined rate, for example as described above with respect to the Equations 18-21, the HEW preamble portion 206 (e.g., the HEW-SIGA field 214) includes an indication of the number of short symbols $N_{SYM\_Short}$ in addition to the HEW_LENGTH indication in the HEW preamble portion 206. In an embodiment, a receiving device that receives the data unit 200 determines the number of long HEW OFDM symbols $N_{SYM\_Longt}$ in the data unit 200 based on the indication of the number of short HEW OFDM symbols $N_{SYM\_Short}$ included in the data unit 200. For example, in an embodiment, the receiving device determines the number of long HEW OFDM symbols $N_{SYM\_Longt}$ in the data unit 200 according to $$N_{SYM\_Long} = \left\lfloor \left( \frac{L\_LENGTH + 3}{3} \times M - T_{HEW\_PREAMBLE} - (3.2 + GI_{Short}) \times N_{SYM\_Short} \right) \Big/ (12.8 + GI_{Long}) \right\rfloor \quad \text{Equation 29}$$

where M=4 when the predetermined rate of 6 Mbps is used, M=8 when the predetermined rate of 3 Mbps is used, and M=16 when the predetermined rate of 1.5 Mbps is used.

Alternatively, in another embodiment in which the HEW OFDM symbols of the data unit 200 include both short HEW OFDM symbols generated using a first tone spacing and long HEW OFDM symbols generated using a second tone spacing, and in which the value of the HEW_LENGTH indication is calculated based on a pre-determined rate, for example as described above with respect to the Equations 18-21, the HEW preamble portion 206 (e.g., the HEW-SIGA field 214) includes respective ambiguity indications to indicate when ambiguity conditions are met when the number of short HEW OFDM symbols and the number of long HEW OFDM symbols are calculated at the receiving device that receives the data unit 200. For example, the HEW PREAMBLE portion 206 (e.g., the HEW-SIGA field 214) includes a first ambiguity bit Ambiguity$_{Long}$ indicative of ambiguity in calculating the number of short HEW OFDM symbols $N_{SYM\_Long}$, and a second ambiguity bit Ambiguity$_{Short}$ indicative of ambiguity in calculating the number of short HEW OFDM symbols $N_{SYM\_Short}$. In an embodiment, the transmitting device sets the Ambiguity$_{Long}$ bit to logic one (1) when a stored condition for long HEW OFDM symbol ambiguity is met for the data unit 200. Similarly, the transmitting device sets the Ambiguity$_{Short}$ bit to logic one (1) when a stored condition for short HEW OFDM symbol ambiguity is met for the data unit 200, in an embodiment. The stored conditions for long HEW OFDM symbol ambiguity and short HEW OFDM symbol ambiguity are based on various factors, such as one or more of (i) the particular values of GI$_{short}$ and GI$_{long}$ being utilized for the data unit 200, (ii) the number of HEW OFDM symbols in the data unit 200, (iii) the number of long HEW OFDM symbols in the data unit 200, (iv) the number of HEW OFDM symbols in the data unit 200, etc., in an embodiment.

In this embodiment, a receiving device that receives the data unit 200 calculates a number of long HEW OFDM symbols $N_{SYM\_Long}$ in the data unit 200 and a number of short HEW OFDM symbols $N_{SYM\_Short}$ in the data unit 200 based on the indications included in the data unit 200. In an embodiment, the receiving device calculates the number of long HEW OFDM symbols $N_{SYM\_Long}$ according to $$N_{SYM\_Long} = \left\lfloor \left( \frac{L\_LENGTH + 3}{3} \times M - T_{HEW\_PREAMBLE} \right) \Big/ (12.8 + GI_{Long}) \right\rfloor - \text{Ambiguity}_{Long} \quad \text{Equation 30}$$

and then calculates the number of long HEW OFDM symbols $N_{SYM\_Long}$ according to $$N_{SYM\_Short} = \left\lfloor \left( \frac{L\_LENGTH + 3}{3} \times M - T_{HEW\_PREAMBLE} - N_{SYM\_Long} \times \right. \right. \quad \text{Equation 31}$$

-continued $$(12.8 + GI_{Long}))\Big/$$

$$(3.2 + GI_{Short})\Big] - \text{Ambiguity}_{Short}$$

In Equations 23 and 24, M=4 when the predetermined rate of 6 Mbps is used, M=8 when the predetermined rate of 3 Mbps is used, and M=16 when the predetermined rate of 1.5 Mbps is used, in various embodiments.

Figure 9:
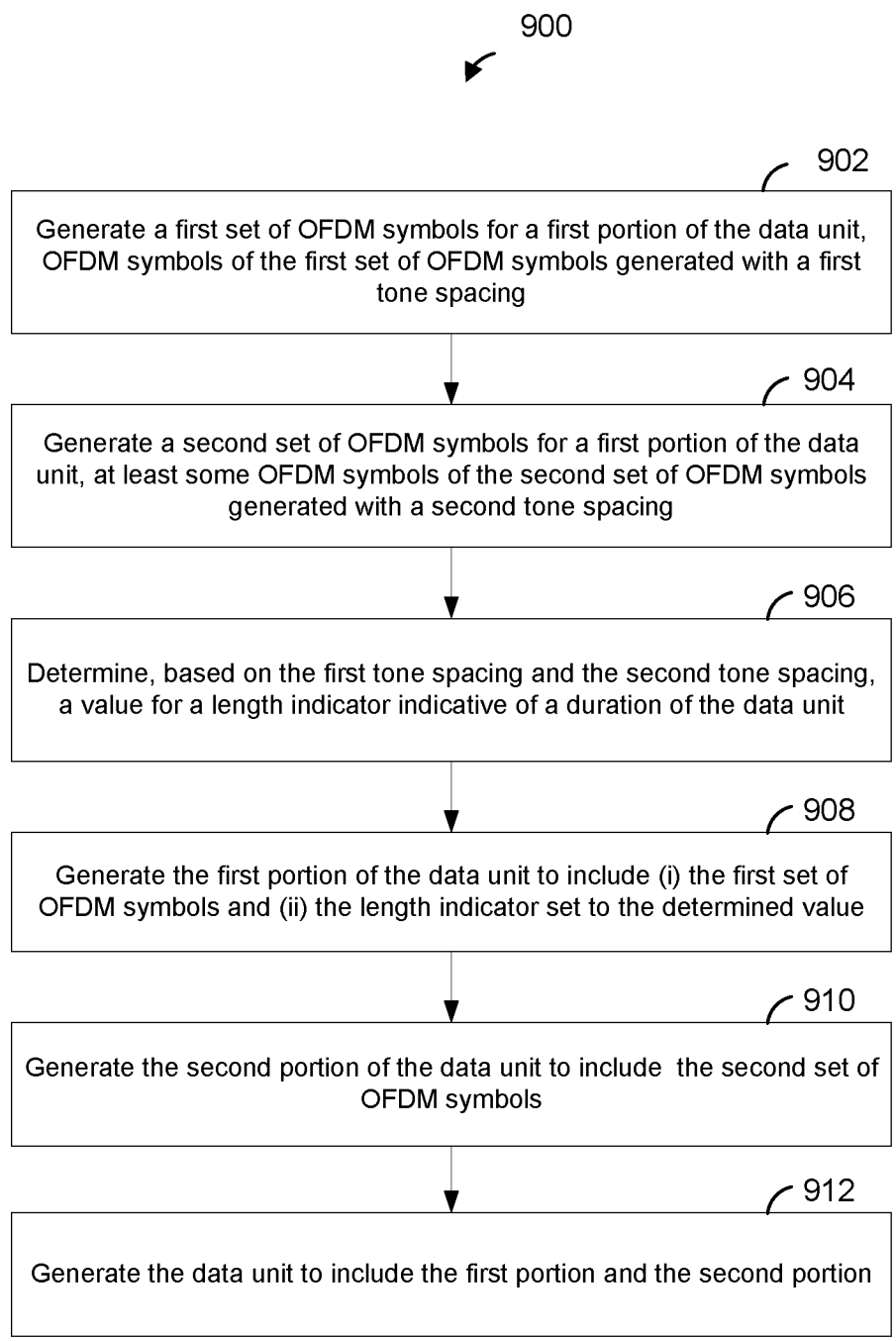
FIG. 9 is a flow diagram of an example method for generating a data unit, according to an embodiment.

FIG. 9 is a flow diagram of an example method 900 for generating a data unit, according to an embodiment. With reference to FIG. 1, the method 900 is implemented by the network interface 16, in an embodiment. For example, in one such embodiment, the PHY processing unit 20 is configured to implement the method 900. According to another embodiment, the MAC processing 18 is also configured to implement at least a part of the method 900. With continued reference to FIG. 1, in yet another embodiment, the method 900 is implemented by the network interface 27 (e.g., the PHY processing unit 29 and/or the MAC processing unit 28). In other embodiments, the method 900 is implemented by other suitable network interfaces.

At block 9002, a first set of OFDM symbols for a first portion of the data unit is generated. In an embodiment, OFDM symbols of the first set of OFDM symbols are generated with a first tone spacing. In an embodiment, the first portion of the data unit is a legacy portion that conforms to a legacy communication protocol. In an embodiment, the first tone spacing is a normal tone spacing defined by a legacy communication protocol.

At block 904, a second set of OFDM symbols for a second portion of the data unit is generated. In an embodiment, at least some OFDM symbols of the second set of OFDM symbols are generated with a second tone spacing which is different from the first tone spacing. In an embodiment, the second portion of the data unit is a non-legacy portion that conforms to a non-legacy communication protocol, such as the HEW communication protocol. In an embodiment, the second tone spacing is a reduced tone spacing that is a fraction of the normal tone spacing (e.g., ½, ¼, etc. of the normal tone spacing) used with the first set of OFDM symbols.

At block 906, a value for a length indicator indicative of the duration of the data unit is determined. In an embodiment, the value of the length indicator is determined based on the first tone spacing used with the OFDM symbols in the first set of OFDM symbols generated at block 902 and the second tone spacing used with the at least some OFDM symbols of the second set of OFDM symbols generated at block 904. In an embodiment, the value for the length indicator is determined using Equation 1 or Equation 6 discussed above. In an embodiment in which the value for the length indicator is determined using Equation 1 or Equation 6, transmission time (TXTIME) in Equation 1 or in Equation 6 is determined using symbol duration of OFDM symbols generated using the first tone spacing and symbol duration of OFDM symbols generated using the second tone spacing, wherein duration of the OFDM symbols is determined as a function of the tone spacing used with the OFDM symbols. For example, transmission time is determined using symbol duration of the OFDM symbols generated with the first tone spacing, and OFDM symbols generated with the second tone spacing, according to Equation 2, in an embodiment.

At block 908, the first portion of the data unit is generated. In an embodiment, the first portion is generated to include the first set of OFDM symbols generated at block 902 and a length indicator set to the value determined at bock 906. In an embodiment, the first portion of the data unit corresponds to the legacy preamble portion 204 of the data unit 200 of FIG. 2. In another embodiment, the first portion corresponds to another portion of the data unit 200 of FIG. 2 or corresponds to a first portion of a suitable data unit other than the data unit 200 of FIG. 2. In an embodiment, the first portion is generated to include a signal field (e.g., the L-SIG field 212 in FIG. 2), and the signal field is generated to include the length indictor. In another embodiment, the length indicator is included in the first portion in a field other than a signal field.

At block 910, the second portion of the data unit is generated. In an embodiment, the second portion is generated to include the second set of OFDM symbols generated at block 904. In an embodiment, the second portion of the data unit corresponds to the preamble portion 206 and the data portion 222 of the data unit 200 of FIG. 2. In another embodiment, the second portion corresponds to another portion of the data unit 200 of FIG. 2 or corresponds to a second portion of a suitable data unit other than the data unit 200 of FIG. 2.

At block 912, the data unit is generated. In an embodiment, the data unit is generated to include the first portion generated at block 908 and the second set of OFDM symbols generated at block 910. In an embodiment, the data unit 200 of FIG. 2 is generated. In another embodiment, a suitable unit different from the data unit 200 of FIG. 2 is generated.

Figure 10:
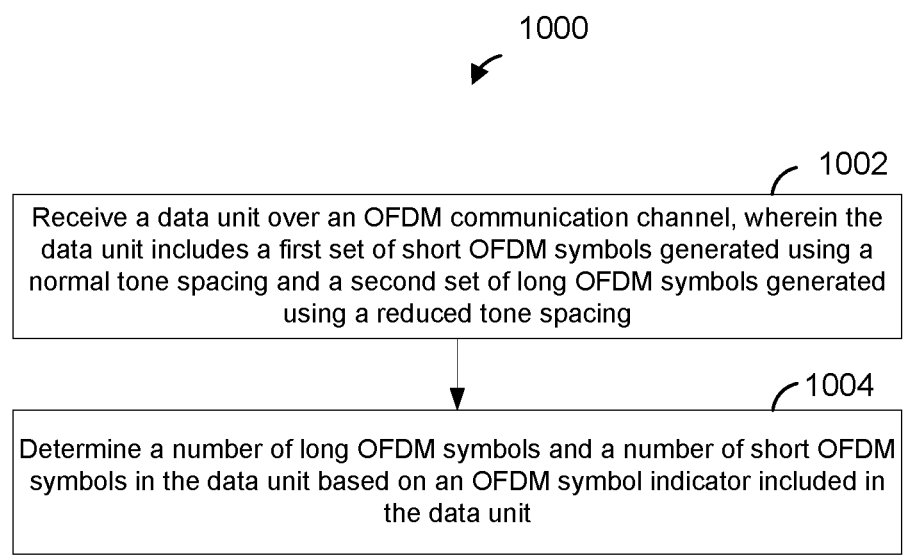
FIG. 10 is a flow diagram of an example method for processing a data unit, according to an embodiment.

FIG. 10 is a flow diagram of an example method 1000 for processing a data unit, according to an embodiment. With reference to FIG. 1, the method 1000 is implemented by the network interface 16, in an embodiment. For example, in one such embodiment, the PHY processing unit 20 is configured to implement the method 1000. According to another embodiment, the MAC processing 18 is also configured to implement at least a part of the method 1000. With continued reference to FIG. 1, in yet another embodiment, the method 1000 is implemented by the network interface 27 (e.g., the PHY processing unit 29 and/or the MAC processing unit 28). In other embodiments, the method 2000 is implemented by other suitable network interfaces.

At block 1002, the data unit is received. In an embodiment, the data unit is received via an OFDM communication channel. In an embodiment, the data unit 200 of FIG. 2 is received. In another embodiment, a suitable data unit different from the data unit 200 of FIG. 2 is received. In an embodiment, the data unit includes a first set of one or more short OFDM symbols generated a normal tone spacing and a second set of one or more OFDM symbols generated using a reduced tone spacing. In an embodiment, the reduced tone spacing is a fraction of the normal tone spacing. For example, the reduced tone spacing is ½ of the normal tone spacing, ¼ of the normal tones spacing, ⅛ of the normal tone spacing, etc. In an embodiment, the ratio between the normal spacing and the reduced spacing is known a priori at the receiving device. In another embodiment, the ratio between the normal spacing and the reduced spacing is indicated in the data unit (e.g., in a signal field of the data unit). In an embodiment, the data unit includes an OFDM symbol indicator indicative of one or both of (i) a number of short OFDM symbols in the first set of OFDM symbols and a number of short OFDM symbols in the second set of OFDM symbols. In an embodiment, the OFDM symbol indication is included in a signal field of the data unit. For example, referring to FIG. 2, the OFDM symbol indicator is included in the HEW-SIG-A field 214 or in the HEW-SIG-B field 200, in an embodiment.

At block 1004, the number of short OFDM symbols in the first set of OFDM symbols and the number of long OFDM symbols in the second set of OFDM symbols are determined. In an embodiment, the number of short OFDM symbols and the number of long OFDM symbols are determined based on the OFDM symbol indicator included in the data unit. In an embodiment, the data unit further includes a length field indicative of a duration of at least a portion of the data unit (e.g., a duration of a non-legacy portion of the data unit, a duration of a data portion of the data unit, a duration of the entire data unit, etc.). In an embodiment, the length indicator is included in a legacy portion of the data unit. For example, referring to FIG. 2, the length indicator is included in the L-SIG field 212, in an embodiment. In another embodiment, the length indicator is included in a non-legacy portion of the data unit. For example, referring to FIG. 2, the length indicator is included in the HEW-SIGA field 214 or in the HEW-SIGB field 220, in an embodiment. In an embodiment, determination of the number of short OFDM symbols and the number of long OFDM symbols is further based on the length indicator included in the data unit.

In an embodiment, the OFDM symbol indicator directly indicates the number of short OFDM symbols and the number of long OFDM symbols, and the number of short OFDM symbols and the number of long OFDM symbols are determined based on the direct indications of the number of short OFDM symbols and the number of long OFDM symbols. In another embodiment, the OFDM symbol indicator indicates only one of the number of short OFDM symbols and the number of long OFDM symbols, and block 1004 includes determining the other one of the number of short OFDM symbols and the number of long OFDM symbols based on the OFDM symbol indicator and the length indictor. For example, the number of long OFDM symbols is determined at block 1004 based on a number of short OFDM symbols indicated by the OFDM symbol indicator and the length indicator according to Equation 9, in an embodiment. As another example, the number of long OFDM symbols is determined at block 1004 based on a number of short OFDM symbols indicated by the OFDM symbol indicator and the length indicator according to Equation 29, in another embodiment.

In some embodiments, the OFDM symbol indicator includes a first ambiguity bit that indicates ambiguity in calculating the number of long OFDM symbols a second ambiguity bit that indicates ambiguity in calculating the number of short OFDM symbols. In one such embodiment, determination at block 1004 includes determining the number of long OFDM symbols based on the first ambiguity bit and the length indicator, and then determining the number of short OFDM symbols based on the second ambiguity bit, the length indicator, and the determined number of short OFDM symbols. For example, in an embodiment, the number of long OFDM symbols and the number of short OFDM symbols are determined according to Equation 10 and Equation 11, respectively. As another example, in another embodiment, the number of long OFDM symbols and the number of short OFDM symbols are determined according to Equation 30 and Equation 31, respectively.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the invention.

In addition, further aspects of the present invention relates to one or more of the following clauses.

In an embodiment, a method for generating a physical layer (PHY) data unit for transmission via a communication channel includes generating a first set of orthogonal frequency domain multiplexing (OFDM) symbols for a first portion of the PHY data unit, wherein OFDM symbols of the first set of OFDM symbols are generated with a first OFDM tone spacing, and generating a second set of OFDM symbols for a second portion of the PHY data unit, wherein at least some OFDM symbols of the second set of OFDM symbols are generated with a second tone spacing different from the first tone spacing. The method further includes determining, based on the first tone spacing and the second tone spacing, a value for a length indicator indicative of a duration of the PHY data unit. The method further still includes generating the first portion of the PHY data unit to include (i) the first set of OFDM symbols and (ii) the length indicator set to the determined value, and generating the second portion of the PHY data unit to include the second set of OFDM symbols. The method additionally includes generating the PHY data unit to include the first portion and the second portion.

In other embodiments, the method includes any suitable combination of one or more of the following features.

The first portion of the preamble includes a first signal field, and wherein the length indicator is included in a length subfield of the first signal field.

The length subfield of the first signal field comprises m bits.

Generating the length indicator includes constraining the value of the length indicator to a maximum of n bits, wherein m and n are integers, wherein m<n.

The method further includes using one or more bits of the length subfield that are not used for indicating length for a purpose other than indicating length.

Using the one or more bits of the length subfield that are not used for indicating length for the purpose other than indicating length comprises using the one or more bits as error checking bits to improve reliability of the first signal field.

Determining the value for the length indicator includes constraining the value of the length indicator to be indivisible by 3.

Determining the value for the length indicator includes determining a transmission time corresponding to transmission of the second set of OFDM symbols as a function of a number of OFDM symbols in the second set of OFDM symbols and a duration of each OFDM symbol in the second set of OFDM symbols.

Determining the value for the length indicator includes applying, to the determined transmission time, a conversion factor that corresponds to a predetermined data rate to convert the transmission time to a length value that at least approximates the actual transmission time according to the predetermined data rate.

Determining the value for the length indicator includes applying a ceiling function to the transmission time to generate an integer value corresponding to the transmission time, wherein applying the ceiling function comprises applying the ceiling function to the converted transmission time after applying the conversion factor to the transmission time.

The method further includes generating a second signal field to be included in the second portion of the PHY data unit, wherein the signal field includes a guard interval indication set to indicate a particular guard interval used with at least some OFDM symbols of the second set of OFDM symbols.

The guard interval indication comprises two bits set to indicate one of four guard intervals available for generating the at least some OFDM symbols of the second set of OFDM symbols.

The first tone spacing is a normal tone spacing and the second tone spacing is a reduced tone spacing that is a fraction of the normal tone spacing.

The second set of OFDM symbols includes (i) a first subset of one or more short OFDM symbols generated using the normal tone spacing and (ii) a second subset of one or more long OFDM symbols generated using the reduced tone spacing.

Generating the second portion of the PHY data unit includes indicating, in the second portion of the PHY data unit, a number of short OFDM symbols in the first subset of OFDM symbols such that a receiving device can determine a number of long OFDM symbols in the second portion of the PHY data unit based on (i) the value of the length indicator in the first portion of the PHY data unit and (ii) the indicated number of short OFDM symbols in the second portion of the PHY data unit.

Generating the second portion of the PHY data unit includes including, in the second portion of the PHY data unit, (i) a first ambiguity indicator to indicate an ambiguity in determining a number of short OFDM symbols in the first subset of OFDM symbols based on the value of the length indicator in the first portion of the PHY data unit and (ii) a second ambiguity indicator to indicate an ambiguity in determining a number of long OFDM symbols in the second subset of OFDM symbols based on the value of the length indicator in the first portion of the PHY data unit.

The method further includes generating a second length indictor to be included in the second portion of the PHY data unit, including determining, based at least in part on the second tone spacing, a value for the second length indicator such that a receiving device can determine a number of OFDM symbols in the second set of OFDM symbols based on the value of the second length indicator.

The second length indicator indicates one or more of (i) the number of OFDM symbols in the second set of OFDM symbols, (ii) a number of short OFDM symbols in the second set of OFDM symbols, the short OFDM symbols generated using the first tone spacing, (iii) a number of long OFDM symbols in the second set of OFDM symbols, the long OFDM symbols generated using the second tone spacing, (iv) a first ambiguity indicator to indicate an ambiguity in determining a number short OFDM symbols in the second set of OFDM symbols, the short OFDM symbols generated using the first tone spacing, and (v) a second ambiguity indicator to indicate an ambiguity in determining a number of long OFDM symbols in the second set of OFDM symbols, the long OFDM symbols generated using the second tone spacing.

The value for the second length indicator is determined based on predetermined data rate such that the receiving device can determine the number of OFDM symbols in the second set of OFDM symbols using the predetermined data rate.

The predetermined data rate is less than 6 megabits per second (Mbps).

In another embodiment, an apparatus comprises a network interface configured to generate a first set of orthogonal frequency domain multiplexing (OFDM) symbols for a first portion of a physical layer (PHY) data unit, wherein OFDM symbols of the first set of OFDM symbols are generated with a first OFDM tone spacing, and generate a second set of OFDM symbols for a second portion of the PHY data unit, wherein at least some OFDM symbols of the second set of OFDM symbols are generated with a second tone spacing different from the first tone spacing. The network interface is further configured to determine, based on the first tone spacing and the second tone spacing, a value for a length indicator indicative of a duration of the PHY data unit. The network interface is further still configured to generate the first portion of the PHY data unit to include (i) the first set of OFDM symbols and (ii) the length indicator set to the determined value, and generate the second portion of the PHY data unit to include the second set of OFDM symbols. The network interface is additionally configured to generate the PHY data unit to include the first portion and the second portion.

In other embodiments, the apparatus includes any suitable combination of one or more of the following features.

The first portion of the preamble includes a first signal field, and wherein the length indicator is included in a length subfield of the first signal field.

The length subfield of the first signal field comprises m bits.

The network interface is configured to constrain the value of the length indicator to a maximum of n bits, wherein m and n are integers, wherein m<n.

The network interface is further configured to use one or more bits of the length subfield that are not used for indicating length for a purpose other than indicating length.

The network interface is configured to use the one or more bits of the length subfield that are not used for indicating length as error checking bits to improve reliability of the first signal field.

The network interface is configured to constrain the value of the length indicator such that the value is not divisible by 3.

The network interface is configured to determine the value for the length indicator at least by determining a transmission time corresponding to transmission of the second set of OFDM symbols as a function of a number of OFDM symbols in the second set of OFDM symbols and a duration of each OFDM symbol in the second set of OFDM symbols, applying, to the determined transmission time, a conversion factor that corresponds to a predetermined data rate to convert the transmission time to a length value that at least approximates the actual transmission time according to the predetermined data rate, and applying a ceiling function to the transmission time to generate an integer value corresponding to the transmission time, wherein applying the ceiling function comprises applying the ceiling function to the converted transmission time after applying the conversion factor to the transmission time.

The network interface is further configured to generate a second signal field to be included in the second portion of the PHY data unit, wherein the signal field includes a guard interval indication set to indicate a particular guard interval used with at least some OFDM symbols of the second set of OFDM symbols.

The guard interval indication comprises two bits set to indicate one of four guard intervals available for generating the at least some OFDM symbols of the second set of OFDM symbols.

The first tone spacing is a normal tone spacing and the second tone spacing is a reduced tone spacing that is a fraction of the normal tone spacing.

The second set of OFDM symbols includes (i) a first subset of one or more short OFDM symbols generated using the normal tone spacing and (ii) a second subset of one or more long OFDM symbols generated using the reduced tone spacing.

The network interface is configured to indicate, in the second portion of the PHY data unit, a number of short OFDM symbols in the first subset of OFDM symbols such that a receiving device can determine a number of long OFDM symbols in the second portion of the PHY data unit based on (i) the value of the length indicator in the first portion of the PHY data unit and (ii) the indicated number of short OFDM symbols in the second portion of the PHY data unit.

The network interface is configured to indicate, in the second portion of the PHY data unit, (i) a first ambiguity indicator to indicate an ambiguity in determining a number of short OFDM symbols in the first subset of OFDM symbols based on the value of the length indicator in the first portion of the PHY data unit and (ii) a second ambiguity indicator to indicate an ambiguity in determining a number of long OFDM symbols in the second subset of OFDM symbols based on the value of the length indicator in the first portion of the PHY data unit.

The network interface is further configured to generate a second length indictor to be included in the second portion of the data unit, wherein generating the second length indicator includes determining, based at least in part on the second tone spacing, a value for the second length indicator such that a receiving device can determine a number of OFDM symbols in the second set of OFDM symbols based on the value of the second length indicator.

The second length indicator indicates one or more of (i) the number of OFDM symbols in the second set of OFDM symbols, (ii) a number of short OFDM symbols in the second set of OFDM symbols, the short OFDM symbols generated using the first tone spacing, (iii) a number of long OFDM symbols in the second set of OFDM symbols, the long OFDM symbols generated using the second tone spacing, (iv) a first ambiguity indicator to indicate an ambiguity in determining a number short OFDM symbols in the second set of OFDM symbols, the short OFDM symbols generated using the first tone spacing, and (v) a second ambiguity indicator to indicate an ambiguity in determining a number of long OFDM symbols in the second set of OFDM symbols, the long OFDM symbols generated using the second tone spacing.

The value for the second length indicator is determined based on predetermined data rate such that the receiving device can determine the number of OFDM symbols in the second set of OFDM symbols using the predetermined data rate.

The predetermined data rate is less than 6 mega-bits per second (Mbps).

In yet another embodiment, a method for processing a physical layer (PHY) data unit includes receiving the PHY data unit via an orthogonal frequency division multiplexing (OFDM) communication channel. The PHY data unit includes (i) a first set of one or more short OFDM symbols generated using a normal tone spacing and (ii) a second set of one or more long OFDM symbols generated using a reduced tone spacing, (iii) an OFDM symbol indicator indicative of a number of OFDM symbols in at least one of (a) the first set of OFDM symbols and (b) the second set of OFDM symbols; The method additionally includes determining, based at least in part on the OFDM symbol indicator, (i) a number of short OFDM symbols in the set of one or more short OFDM symbols and (ii) a number of long OFDM symbols in the set of one or more long OFDM symbols.

In other embodiments, the method includes any suitable combination of one or more of the following features.

The PHY data unit further includes a length indicator indicative of a duration of at least a portion of the PHY data unit.

Determining the number of short OFDM symbols and the number of long OFDM symbols is further based on the length indicator.

The PHY data unit (i) conforms to a first communication protocol, (ii) includes a legacy portion decodable by legacy devices that conform to a second communication protocol but do not conform to the first communication protocol, and wherein the length indicator is included in the legacy portion to allow a legacy device to at least approximately determine the duration of the PHY data unit.

The OFDM symbol indicator indicates the number short OFDM symbols, and wherein determining the number of short OFDM symbols and the number of long OFDM symbols includes determining the number of long OFDM symbols based on the length indicator and the indicated number of short OFDM symbols.

The OFDM symbol indicator includes (i) a first ambiguity indicator to indicate an ambiguity in determining a number of long OFDM symbols and (ii) a second ambiguity indicator to indicate an ambiguity in determining a number of short OFDM symbols, Determining the number of long OFDM symbols and the number of short OFDM symbols includes determining the number of long OFDM symbols based on the length indicator and the first ambiguity indicator, and determining the number of short OFDM symbols based on the length indicator, the second ambiguity bit, and the determined number of long OFDM symbols.

The PHY data unit (i) conforms to a first communication protocol and (ii) includes a legacy portion decodable by legacy devices that conform to a second communication protocol but do not conform to the first communication protocol, and wherein the length indicator is included in a non-legacy portion of the PHY data unit, the non-legacy portion not decodable by communication device that do not conform to the first communication protocol.

The OFDM symbol indicator includes a first set of bits that indicate the number of long OFDM symbols and a second set of bits that indicate the number of short OFDM symbols.

The length indicator indicates a length calculated based on an actual length of the PHY data unit and based on a predetermined rate such that a receiving device can at least approximately determine the actual length of the PHY data unit based the length indicator and the predetermined rate.

The predetermined rate is lower than a lowest rate defined by the second communication protocol.

The OFDM symbol indicator includes (i) a first ambiguity indicator to indicate an ambiguity in determining a number of long OFDM symbols and (ii) a second ambiguity indicator to indicate an ambiguity in determining a number of short OFDM symbols, and wherein determining the number of long OFDM symbols and the number of short OFDM symbols includes determining the number of long OFDM symbols based on the length indicator and the first ambiguity indicator, and determining the number of short OFDM symbols based on the length indicator, the second ambiguity bit, and the determined number of long OFDM symbols.

The reduced OFDM spacing is ¼ fraction of the normal OFDM spacing.

In still another embodiment, an apparatus comprises a network interface configured to receive a physical layer (PHY) data unit via an orthogonal frequency division multiplexing (OFDM) communication channel. The PHY data unit includes (i) a first set of one or more short OFDM symbols generated using a normal tone spacing and (ii) a second set of one or more long OFDM symbols generated using a reduced tone spacing, (iii) an OFDM symbol indicator indicative of a number of OFDM symbols in at least one of (a) the first set of OFDM symbols and (b) the second set of OFDM symbols. The network interface is further configured to determine, based at least in part on the OFDM symbol indicator, (i) a number of short OFDM symbols in the set of one or more short OFDM symbols and (ii) a number of long OFDM symbols in the set of one or more long OFDM symbols.

In other embodiments, the apparatus includes any suitable combination of one or more of the following features.

The PHY data unit further includes a length indicator indicative of a duration of at least a portion of the PHY data unit.

The network interface is configured to determine the number of short OFDM symbols and the number of long OFDM symbols further based on the length indicator.

The PHY data unit (i) conforms to a first communication protocol, (ii) includes a legacy portion decodable by legacy devices that conform to a second communication protocol but do not conform to the first communication protocol.

The length indicator is included in the legacy portion to allow a legacy device to at least approximately determine the duration of the PHY data unit.

The OFDM symbol indicator indicates the number short OFDM symbols,

The network interface is configured to determine the number of long OFDM symbols based on the length indicator and the indicated number of short OFDM symbols.

The OFDM symbol indicator includes (i) a first ambiguity indicator to indicate an ambiguity in determining a number of long OFDM symbols and (ii) a second ambiguity indicator to indicate an ambiguity in determining a number of short OFDM symbols, The network interface is configured to determine the number of long OFDM symbols based on the length indicator and the first ambiguity indicator, and determine the number of short OFDM symbols based on the length indicator, the second ambiguity bit, and the determined number of long OFDM symbols.

The PHY data unit (i) conforms to a first communication protocol and (ii) includes a legacy portion decodable by legacy devices that conform to a second communication protocol but do not conform to the first communication protocol, and wherein the length indicator is included in a non-legacy portion of the PHY data unit, the non-legacy portion not decodable by communication device that do not conform to the first communication protocol.

The OFDM symbol indicator includes a first set of bits that indicate the number of long OFDM symbols and a second set of bits that indicate the number of short OFDM symbols.

The length indicator indicates a length calculated based on an actual length of the PHY data unit and based on a predetermined rate such that a receiving device can at least approximately determine the actual length of the PHY data unit based the length indicator and the predetermined rate.

The predetermined rate is lower than a lowest rate defined by the second communication protocol.

The OFDM symbol indicator includes (i) a first ambiguity indicator to indicate an ambiguity in determining a number of long OFDM symbols and (ii) a second ambiguity indicator to indicate an ambiguity in determining a number of short OFDM symbols, The network interface is configured to determine the number of long OFDM symbols based on the length indicator and the first ambiguity indicator, and determine the number of short OFDM symbols based on the length indicator, the second ambiguity bit, and the determined number of long OFDM symbols.

The reduced OFDM spacing is ¼ fraction of the normal OFDM spacing.

What is claimed is:

1. A method for generating a physical layer (PHY) data unit for transmission via a communication channel, the method comprising:
    determining, at the communication device and based on a first tone spacing and a second tone spacing, a value for a length indicator indicative of a duration of the PHY data unit, wherein a first set of orthogonal frequency domain multiplexing (OFDM) symbols for a first portion of the PHY data unit use the first tone spacing, wherein at least some OFDM symbols of a second set of OFDM symbols for a second portion of the PHY data unit use a second tone spacing different from the first tone spacing, and wherein determining the value for the length indicator includes
        determining a transmission time corresponding to transmission of the second set of OFDM symbols as a function of a number of OFDM symbols in the second set of OFDM symbols and a duration of each OFDM symbol in the second set of OFDM symbols,
        calculating a first intermediate value using the determined transmission time,
        applying a ceiling function to the first intermediate value,
        calculating a second intermediate value based on multiplying a result of the ceiling function by three, and
        modifying the second intermediate value by n, wherein n is one or two, so that the determined value for the length indicator is not divisible by three; and
    generating, at the communication device, the PHY data unit, including:
        generating the first portion of the PHY data unit to include (i) the first set of OFDM symbols and (ii) the length indicator set to the determined value, wherein the first portion of the PHY data unit is generated such that the length indicator is included in a legacy portion of a preamble of the PHY data unit, and
        generating the second portion of the PHY data unit to include the second set of OFDM symbol.

2. The method of claim 1, wherein the first portion of the PHY data unit includes a first signal field, and wherein the length indicator is included in a length subfield of the first signal field.

3. The method of claim 2, wherein
    the length subfield of the first signal field comprises m bits, and generating the length indicator includes constraining the value of the length indicator to a maximum of p bits, wherein m and p are integers, wherein p<m.

4. The method of claim 3, further comprising using one or more bits of the length subfield that are not used for indicating length for a purpose other than indicating length.

5. The method of claim 4, wherein using the one or more bits of the length subfield that are not used for indicating length for the purpose other than indicating length comprises using the one or more bits as error checking bits to improve reliability of the first signal field.

6. The method of claim 2, further comprising generating a second signal field included in the second portion of the PHY data unit.

7. The method of claim 1, wherein the second tone spacing is a fraction of the first tone spacing.

8. The method of claim 1, wherein the second set of OFDM symbols includes a subset of one or more OFDM symbols generated using the first tone spacing.

9. An apparatus, comprising:
a wireless network interface configured to:
determine, based on a first tone spacing and a second tone spacing, a value for a length indicator indicative of a duration of a physical layer (PHY) data unit, wherein a first set of orthogonal frequency domain multiplexing (OFDM) symbols for a first portion of the PHY data unit use the first tone spacing, wherein at least some OFDM symbols of a second set of OFDM symbols for a second portion of the PHY data unit use a second tone spacing different from the first tone spacing, and wherein determining the value for the length indicator includes
determining a transmission time corresponding to transmission of the second set of OFDM symbols as a function of a number of OFDM symbols in the second set of OFDM symbols and a duration of each OFDM symbol in the second set of OFDM symbols,
calculating a first intermediate value using the determined transmission time,
applying a ceiling function to the first intermediate value,
calculating a second intermediate value based on multiplying a result of the ceiling function by three, and
modifying the second intermediate value by n, wherein n is one or two, so that the determined value for the length indicator is not divisible by three;

wherein the wireless network interface is further configured to generate the PHY data unit, including:
generating the first portion of the PHY data unit to include (i) the first set of OFDM symbols and (ii) the length indicator set to the determined value, wherein the first portion of the PHY data unit is generated such that the length indicator is included in a legacy portion of a preamble of the PHY data unit, and
generating the second portion of the PHY data unit to include the second set of OFDM symbol.

10. The apparatus of claim 9, wherein the first portion of the PHY data unit includes a first signal field, and wherein the length indicator is included in a length subfield of the first signal field.

11. The apparatus of claim 10, wherein:
the length subfield of the first signal field comprises m bits; and
the wireless network interface is further configured to constrain the value of the length indicator to a maximum of p bits, wherein m and p are integers, wherein p<m.

12. The apparatus of claim 11, wherein the wireless network interface is further configured to use one or more bits of the length subfield that are not used for indicating length for a purpose other than indicating length.

13. The apparatus of claim 12, wherein the wireless network interface is further configured to use the one or more bits not used for indicating length as error checking bits to improve reliability of the first signal field.

14. The apparatus of claim 10, wherein the wireless network interface is further configured to generate a second signal field included in the second portion of the PHY data unit.

15. The apparatus of claim 9, wherein the second tone spacing is a fraction of the first tone spacing.

16. The apparatus of claim 9, wherein the second set of OFDM symbols includes a subset of one or more OFDM symbols generated using the first tone spacing.

17. The apparatus of claim 9, wherein the wireless network interface comprises one or more integrated circuit devices.

18. The apparatus of claim 9, wherein the wireless network interface comprises one or more transceivers configured to transmit the PHY data unit.

19. The apparatus of claim 18, further comprising:
one or more antennas coupled to the one or more transceivers.

* * * * *